US011226507B2

United States Patent
Liang et al.

(10) Patent No.: US 11,226,507 B2
(45) Date of Patent: Jan. 18, 2022

(54) METHOD AND SYSTEM FOR FORMATION OF STABILIZED TETRAGONAL BARIUM TITANATE

(71) Applicant: PSIQUANTUM, CORP., Palo Alto, CA (US)

(72) Inventors: Yong Liang, Niskayuna, NY (US); Mark G. Thompson, San Jose, CA (US); Chia-Ming Chang, Palo Alto, CA (US); Vimal Kumar Kamineni, Fremont, CA (US)

(73) Assignee: PSIQUANTUM, CORP., Palo Alto, CA (US)

( * ) Notice: Subject to any disclaimer, the term of this patent is extended or adjusted under 35 U.S.C. 154(b) by 0 days.

(21) Appl. No.: 17/083,141

(22) Filed: Oct. 28, 2020

(65) Prior Publication Data
US 2021/0124233 A1 Apr. 29, 2021

Related U.S. Application Data

(60) Provisional application No. 62/927,373, filed on Oct. 29, 2019.

(51) Int. Cl.
*G02F 1/035* (2006.01)
*G02F 1/225* (2006.01)
(Continued)

(52) U.S. Cl.
CPC .............. *G02F 1/035* (2013.01); *G02F 1/212* (2021.01); *G02F 1/225* (2013.01); *G02B 2006/12142* (2013.01)

(58) Field of Classification Search
CPC .......... G02F 1/035; G02F 1/212; G02F 1/225; G02B 2006/12142
(Continued)

(56) References Cited

U.S. PATENT DOCUMENTS 5,886,867 A * 3/1999 Chivukula ........ H01L 27/11502
361/311
6,411,422 B2 * 6/2002 Wang ....................... G02F 1/21
359/260
(Continued)

FOREIGN PATENT DOCUMENTS

KR 101110382 B1 2/2012
WO 2006028477 A1 3/2006

OTHER PUBLICATIONS

"Phase transitions in BaTiO3 thin films and BaTiO3/BaZrO3 superlattices" by Yuzyuk et al, Journal of Applied Physics, vol. 116, paper 184102. (Year: 2014).*

(Continued)

*Primary Examiner* — Robert Tavlykaev
(74) *Attorney, Agent, or Firm* — Kilpatrick Townsend & Stockton LLP

(57) ABSTRACT

An electro-optic device includes a substrate and a waveguide on the substrate. The waveguide includes a layer stack including a plurality of electro-optic material layers interleaved with a plurality of interlayers, a waveguide core adjacent to the layer stack, a waveguide cladding layer, and a pair of electrodes in electrical contact with the plurality of electro-optic material layers. The plurality of interlayers maintains a first lattice structure at room temperature and a cryogenic temperature. The plurality of electro-optic material layers maintains a second lattice structure and crystallographic phase at the room temperature and the cryogenic temperature.

19 Claims, 12 Drawing Sheets

(51) Int. Cl.
*G02F 1/21* (2006.01)
*G02B 6/12* (2006.01)

(58) Field of Classification Search
USPC .......................................................... 385/1–3
See application file for complete search history.

(56) References Cited

U.S. PATENT DOCUMENTS

| | | | | |
|---|---|---|---|---|
| 6,524,651 | B2* | 2/2003 | Gan | C30B 23/02 427/255.27 |
| 6,890,816 | B2* | 5/2005 | Liang | C30B 25/18 438/252 |
| 6,916,717 | B2* | 7/2005 | Li | C30B 25/18 438/287 |
| 7,557,978 | B2* | 7/2009 | Sato | G02F 1/035 359/254 |
| 8,224,143 | B2* | 7/2012 | Masuda | G02F 1/035 385/130 |
| 10,451,951 | B1* | 10/2019 | Yap | G02F 1/2255 |
| 2002/0109178 | A1* | 8/2002 | McMillan | C23C 18/1216 257/306 |
| 2003/0015731 | A1* | 1/2003 | Curless | H01L 21/02521 257/200 |
| 2004/0264909 | A1 | 12/2004 | Tuller et al. | |
| 2005/0040481 | A1* | 2/2005 | Shimizu | H01L 21/02244 257/411 |
| 2005/0135764 | A1 | 6/2005 | Painter et al. | |
| 2010/0118386 | A1 | 5/2010 | Wessels et al. | |
| 2013/0149794 | A1* | 6/2013 | Wang | H01L 21/02197 438/3 |
| 2016/0313579 | A1* | 10/2016 | Yokoyama | G02B 6/125 |
| 2020/0409190 | A1* | 12/2020 | Demkov | C30B 23/025 |

OTHER PUBLICATIONS

"Absence of low-temperature phase transitions in epitaxial BaTiO3 thin films" by Tenne et al, Physical Review B, vol. 69, paper 174101 (Year: 2004).*

"Diffuse phase transitions, electrical conduction, and low temperature dielectric properties of sol-gel derived ferroelectric barium titanate thin films" by Thomas et al., Journal of Applied Physics, vol. 90, No. 3., pp. 1480-1488 (Year: 2001).*

"Enhancement of Ferroelectricity in Strained BaTiO3 Thin Films" by Choi et al, Science, vol. 306, pp. 1005-1009 (Year: 2004).*

"Giant increase of ferroelectric phase transition temperature in highly strained ferroelectric [BaTiO3]0.7/\/[BaZrO3]0.3/\ superlattice" by Belhadi et al, EPL, vol. 106, paper 17004 (Year: 2014).*

PCT/US2020/057731, "International Search Report and Written Opinion", dated Feb. 2, 2021, 8 pages.

* cited by examiner

METHOD AND SYSTEM FOR FORMATION OF STABILIZED TETRAGONAL BARIUM TITANATE

CROSS-REFERENCES TO OTHER APPLICATIONS

This application claims priority to U.S. provisional patent application Ser. No. 62/927,373, for "METHOD AND SYSTEM FOR FORMATION OF STABILIZED TETRAGONAL BARIUM TITANATE" filed on Oct. 29, 2019 which is hereby incorporated by reference in entirety for all purposes.

BACKGROUND

Electro-optic (EO) devices, such as EO modulators and switches, have been used in various optical systems, such as optical communication and optical computing systems. For example, optical phase modulators can be used in integrated optics systems, optical communication transmitters or transceivers, and the like. EO modulators or switches may utilize various EO effects, such as free-carrier electro-refraction, free-carrier electro-absorption, Pockels effect, Kerr effect, or the like, to modify light properties during operation, such as changing the phase or amplitude of light propagating through certain paths in the EO modulators or switches. EO devices using materials with higher EO effects can operate with lower control voltage, lower power consumption, and often at higher speeds.

SUMMARY

Techniques disclosed herein relate generally to electro-optic (EO) devices. More specifically, embodiments disclosed herein relate to techniques for achieving high EO effects in EO devices (e.g., optical switches or optical modulators) at low temperatures, such as cryogenic temperatures. In one particular embodiment, an EO device including an EO material stack characterized by high electro-optic coefficients at low temperatures (e.g., cryogenic temperatures) is utilized to improve the modulation and/or switching performance of the EO device at low temperatures. The EO material stack may include interleaved and interlocked thin EO material layers and interlayers. The EO material in the EO material layers, when used in bulk, may change its crystal structure at different operation temperatures, while the interlayers may have lattice structures that do not change at the operation temperatures. Thus, the thin EO material layers interlocked to the interlayers may maintain their lattice structures and hence the EO coefficients when the operation temperature changes. Techniques disclosed herein can be used in a wide variety of photonic and optoelectronic devices that operate at low temperature.

According to certain embodiments, an electro-optic device may include a substrate and a waveguide on the substrate. The waveguide may include a layer stack including a plurality of electro-optic material layers interleaved with a plurality of interlayers. The waveguide may also include a waveguide core adjacent to the layer stack, a waveguide cladding layer, and a pair of electrodes in electrical contact with the plurality of electro-optic material layers. The plurality of interlayers may be configured to maintain a first lattice structure at room temperature and a cryogenic temperature. The plurality of electro-optic material layers may maintain a second lattice structure and crystallographic phase at the room temperature and the cryogenic temperature. In some embodiments, the plurality of interlayers and the plurality of electro-optic material layers may be characterized by a tetragonal lattice structure at the cryogenic temperature. In some embodiments, the plurality of electro-optic material layers may be characterized by an in-plane polarization at the cryogenic temperature.

In some embodiments of the electro-optic device, the plurality of electro-optic material layers may include a ferroelectric crystal or a ferroelectric thin film. The ferroelectric crystal may include at least one of $BaTiO_3$, $(Ba,Sr)TiO_3$, $Pb(Zr,Ti)O_3$, or $(Pb, La)(Zr,Ti)O_3$. In some embodiments, the plurality of electro-optic material layers may be characterized by a Pockels coefficient greater than 300 pm/V at the cryogenic temperature. The plurality of interlayers may include at least one of MgO, $LaAlO_3$, $(Ba,Sr)TiO_3$, $BaHfO_3$, $BaMoO_3$, $BaNbO_3$, $BaZrO_3$, $SrHfO_3$, $SrTiO_3$, $SrMoO_3$, $SrNbO_3$, or $SrZrO_3$. In some embodiments, a ratio between a thickness of each of the plurality of electro-optic material layers and a thickness of each of the plurality of interlayers may be equal to or less than 20:1.

In some embodiments of the electro-optic device, the waveguide core may include one or more electro-optic material layers in the plurality of electro-optic material layers. The waveguide cladding layer may be in physical contact with an electro-optic material layer in the plurality of electro-optic material layers, and may be characterized by a thermal expansion coefficient and optical refraction index different from a thermal expansion coefficient and optical refraction index of the electro-optic material layer. The waveguide cladding layer may include, for example, at least one of $Si_3N_4$, $SiO_2$, $Al_2O_3$, MgO, SiCN, SiON, SiCO, SiOCN, or $HfO_2$.

In some embodiments, the EO device may further include an epitaxial seed layer between the substrate and the waveguide. The epitaxial seed layer may include, for example, at least one of MgO, $LaAlO_3$, $BaHfO_3$, $BaZrO_3$, $SrHfO_3$, $SrTiO_3$, $SrMoO_3$, or $SrZrO_3$. In some embodiments, the EO device may further include a buffer layer between the epitaxial seed layer and the substrate. Each of the pair of electrodes may be in physical contact with each of the plurality of electro-optic material layers. In some embodiments, the waveguide cladding layer may be between the substrate and the layer stack. The waveguide may be a section of a Mach-Zehnder interferometer, a resonator, an optical switch, an electro-optic modulator, or the like.

According to certain embodiments, a wafer may include a substrate and a layer stack on the substrate. The layer stack may include a plurality of electro-optic material layers, and a plurality of interlayers interleaved with the plurality of electro-optic material layers. The plurality of interlayers may maintain a first lattice structure at room temperature and a cryogenic temperature, and the plurality of electro-optic material layers may maintain a second lattice structure and crystallographic phase at the room temperature and the cryogenic temperature. In some embodiments, the first lattice structure and the second lattice structure may be the same lattice structure, such as a tetragonal lattice structure. In some embodiments, the wafer may also include an epitaxial seed layer between the substrate and the layer stack, where the epitaxial seed layer may include, for example, at least one of MgO, $LaAlO_3$, $BaHfO_3$, $BaZrO_3$, $SrHfO_3$, $SrTiO_3$, or $SrZrO_3$. In some embodiments, the wafer may also include an oxidized layer of the substrate between the epitaxial seed layer and the substrate.

In some embodiments of the wafer, the plurality of electro-optic material layers may include at least one of $BaTiO_3$, $(Ba,Sr)TiO_3$, $Pb(Zr,Ti)O_3$, or $(Pb, La)(Zr,Ti)O_3$. The plurality of interlayers may include at least one of MgO, $LaAlO_3$, $(Ba,Sr)TiO_3$, $BaHfO_3$, $BaZrO_3$, $SrHfO_3$, $SrZrO_3$, or $SrNbO_3$. In some embodiments, a ratio between a thickness of each of the plurality of electro-optic material layers and a thickness of each of the plurality of interlayers may be equal to or less than 20:1.

According to certain embodiments, a method may include depositing a seed layer on a substrate, epitaxially depositing a first electro-optic material layer on the seed layer, annealing the substrate, the seed layer, and the first electro-optic material layer in an oxygen environment to form an oxide buffer layer between the substrate and the seed layer, depositing a first interlayer that includes a material that can maintain a first lattice structure at room temperature and a cryogenic temperature on the first electro-optic material layer, depositing a second electro-optic material layer on the first interlayer, and annealing the second electro-optic material layer and the first interlayer. The first electro-optic material layer and the second electro-optic material layer may include an electro-optic material characterized by a second lattice structure at the cryogenic temperature different from a third lattice structure at the room temperature. In some embodiments, the third lattice structure and the first lattice structure may be the same lattice structure, such as a tetragonal lattice structure. In some embodiments, a ratio between a thickness of the first electro-optic material layer and a thickness of the first interlayer may be equal to or less than 20:1.

In some embodiments, annealing the substrate, the seed layer, and the first electro-optic material layer may include annealing at a temperature above a softening temperature of the oxide buffer layer. The method may also include depositing a second interlayer that includes the material that maintains the first lattice structure at the room temperature and the cryogenic temperature on the second electro-optic material layer, depositing a third electro-optic material layer on the second interlayer, and annealing the third electro-optic material layer and the second interlayer.

In some embodiments, the method may also include patterning the third electro-optic material layer to form a waveguide core, and depositing a dielectric cladding layer on the waveguide core. Patterning the third electro-optic material layer may include etching the third electro-optic material layer using the second interlayer as an etch stop layer. In some embodiments, the method may also include etching trenches in the first, second, and third electro-optic material layers and the first and second interlayers, and filling the trenches with a conductive material. Etching the trenches may include etching the first, second, and third electro-optic material layers using the oxide buffer layer as an etch stop layer.

In some embodiments, the method may include forming a waveguide on the third electro-optic material layer. In some embodiments, forming the waveguide on the third electro-optic material layer may include forming a waveguide core on the third electro-optic material layer, and depositing a dielectric cladding layer on the waveguide core. In some embodiments, forming the waveguide core on the third electro-optic material layer may include depositing an layer of a high refractive index material on the third electro-optic material layer, and patterning the layer of the high refractive index material. In some embodiments, forming the waveguide core on the third electro-optic material layer may include depositing a dielectric layer on the third electro-optic material layer, depositing an layer of a high refractive index material on the dielectric layer, and patterning the layer of the high refractive index material. In some embodiments, forming the waveguide on the third electro-optic material layer may include bonding a wafer including the waveguide to the third electro-optic material layer.

Numerous benefits are achieved by way of the present disclosure over conventional techniques. For example, the examples of methods, devices, and systems disclosed herein can maintain the lattice structures and thus the EO coefficients of ferroelectric materials (e.g., the tetragonal phase and the Pockels coefficient of $BaTiO_3$) at low temperatures, such as cryogenic temperatures, thereby improving the performance of EO devices, such as EO switches or EO modulators, at cryogenic temperatures. As such, a reduced electric field or bias signal can be used to achieve the desired refractive index modulation and/or phase modulation for light modulation or switching, thereby reducing power consumption and increasing efficiency and/or speed of the devices. Moreover, embodiments disclosed herein enable larger changes in effective refraction index at low temperatures than using conventional techniques. As a result, device length can be decreased, which in turn reduces optical losses and physical dimensions of the EO devices. These and other embodiments along with many of its advantages and features are described in more detail in conjunction with the text below and attached figures.

DETAILED DESCRIPTION

Figure 1A:
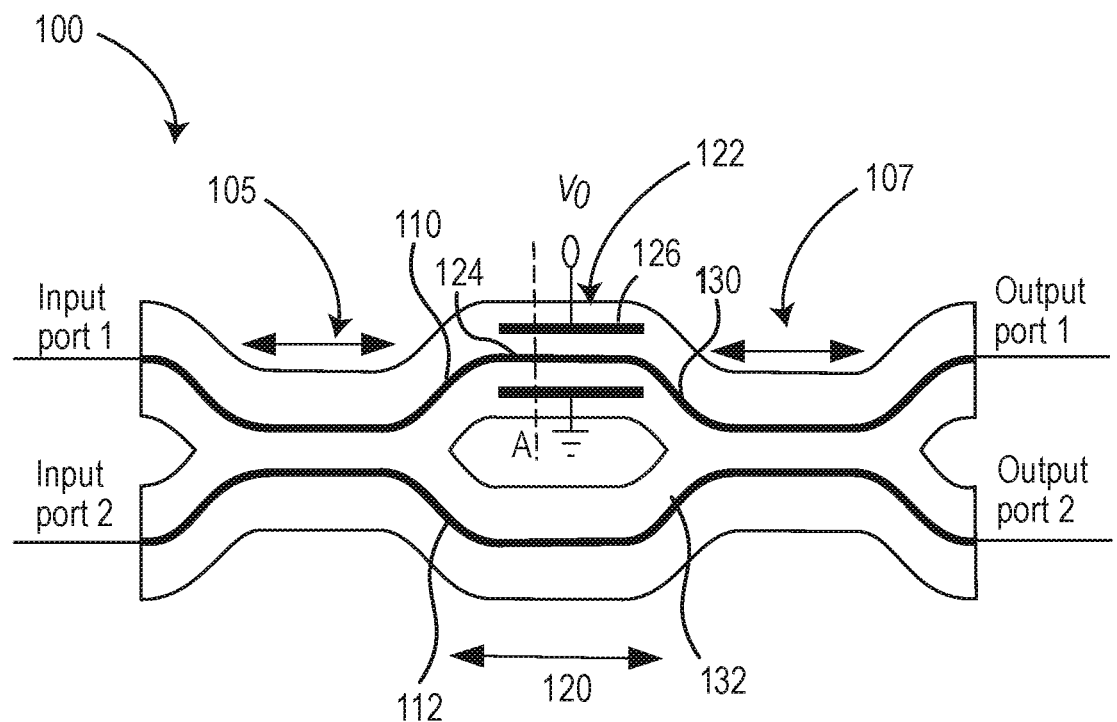
FIG. 1A is a simplified diagram illustrating an example of an optical switch including a Mach-Zehnder interferometer according to certain embodiments.

Techniques disclosed herein relate generally to electro-optic (EO) devices. More specifically, embodiments disclosed herein relate to techniques for achieving high EO effects in EO materials (e.g., ferroelectric materials) at low temperatures, such as cryogenic temperatures, and utilizing the high EO effects of the EO materials in EO devices, such as optical modulators and switches, to reduce power consumption and improve efficiency and speed during operations of the EO devices at low temperatures. Merely by way of example, embodiments are provided in the context of integrated optical systems that include active optical devices, but the techniques disclosed herein are not limited to this example and have wide applicability to a variety of optical and optoelectronic systems. Various inventive embodiments are described herein, including methods, processes, materials, wafers, systems, devices, and the like.

EO devices using materials with higher EO effects can operate with a lower control voltage, a lower power consumption, and at a higher speed as compared devices using materials with relatively lower EO coefficients. In some applications, such as linear optical quantum computing applications, the EO devices may operate at very low temperatures, such as cryogenic temperatures (e.g., about 4 K). The EO effects, such as the Pockels coefficients of some EO materials, may degrade significantly at low temperatures. For example, $BaTiO_3$ (BTO) can be used in EO switches due to its high Pockels coefficient (e.g., greater than about 900 picometers/V at room temperature) and compatibility with silicon CMOS processes. However, the Pockels coefficient of BTO at about 4 K may degrade to less than about one third of the Pockels coefficient at room temperature. Thus, the efficiency of the EO switches may be reduced significantly at cryogenic temperatures. As defined herein, room temperature is a temperature at approximately 20° C. and is more particularly defined as a temperature between 18° C. and 22° C. As defined herein, a cryogenic temperature is a temperature below −150° C. and is more particularly defined as a temperature between −150° C. and −273° C.

According to certain embodiments, it is determined that the degradation of the EO effects (e.g., Pockels coefficient) of some EO materials at low temperatures may be caused by the crystallographic phase transitions of the EO material crystal lattices at different temperatures. For example, BTO may undergo crystallographic phase transitions from a tetragonal phase at room temperature to an orthorhombic phase below room temperature, and then to a rhombohedral phase towards cryogenic temperatures. The crystallographic phase transitions from the tetragonal phase to the rhombohedral phase may contribute to the Pockels effect degradation from room temperature to cryogenic temperatures. As such, according to certain embodiments, the EO effects of the EO materials may be maintained at a high level (e.g., close to the level at room temperature) at low temperatures by maintaining the tetragonal lattice structure of the EO materials at the low temperatures. In some embodiments this may be achieved by, for example, by interlocking thin layers of the EO materials with interlayers that do not undergo lattice structure (or crystallographic phase) and polarization changes when the operating temperature drops from room temperature to cryogenic temperatures, or undergoes a crystallographic phase transition at temperatures different from those of EO materials, thus hindering the crystallographic phase transition of the EO materials. The interlayers may help to maintain stress in the EO materials and prevent the EO material layers from changing the lattice structure and polarization when the operating temperature decreases. As a result, the EO coefficients of the EO materials can be maintained at a level close to the EO coefficients at room temperature. Thus, EO devices including the interleaved structures may maintain high efficiency and speed at cryogenic temperatures.

According to certain embodiments, active photonic devices described herein may utilize the high electro-optic effects, such as the Pockels effect, to efficiently modulate and/or switch optical signals at low temperatures. For example, techniques disclosed herein are applicable to optical modulators, in which the intensity of the transmitted light may be modulated according to, for example, a sinusoidal function or a square function, as well as optical switches, in which the light may be selected from an input port (e.g., a waveguide) in one or more input ports and output to an output port (e.g., a waveguide) in one or more output ports.

According to certain embodiments, the EO materials may be used in devices with different waveguide structures and/or waveguide structures manufactured by different processes. For example, the EO materials may be used as the waveguide cores, the under-cladding layers, and/or the upper-cladding layers in the waveguide structures. In various embodiments, the waveguide cores may be deposited on the EO material layers or etched in the EO material layers, or may be formed on a semiconductor substrate and then bonded to a wafer or device including the EO material layers.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Silicon photonic integrated circuits (PICs) can offer better performance (e.g., lower loss, higher speed, higher bandwidth, and thermal insulation) than electrical integrated circuits (EICs), and can be used for quantum communication or quantum computing, where photons may be used as qubits due to their quantum nature and optical interconnects may be used to provide higher bandwidth for digital data transfer between cryogenic processors and the room temperature environment. However, the performance of PICs at cryogenic temperatures may need to be improved in part due to the absence of efficient EO modulation for light switching and/or light modulation at low temperatures. For example, some integrated optical switches operating at cryogenic temperatures may use thermo-optic phase shifters or plasma-dispersion switches, which may suffer from some intrinsic limitations. The thermo-optic switches that use heat to change the refractive indices of materials may need significant cooling power and may have a low bandwidth and a low switching speed. The plasma-dispersion switches may use high doping levels to compensate for charge carrier freeze-out at low temperatures, and thus small resonators may be used in the plasma-dispersion switches, which may have a high resistance, high insertion loss, and low bandwidth.

Some EO materials may exhibit linear electro-optic effects, where the refractive index of the materials may change in proportion to the strength of the electric field applied to the materials. Such linear electro-optic effects are referred to as Pockels effect and may occur in non-centrosymmetric materials, such as crystal materials of, for example, lithium niobate ($LiNbO_3$), lithium tantalate ($LiTaO_3$), potassium di-deuterium phosphate (KDP), β-barium borate (BBO), potassium titanium oxide phosphate (KTP), and some compound semiconductors, such as gallium arsenide (GaAs) and indium phosphide (InP). EO switches based on the Pockels effect may have low propagation losses, high bandwidth, and low static power consumption at room temperature. In addition, EO switches based on the EO Pockels effect may not suffer from the intrinsic limitations of the thermo-optic and plasma-dispersion effects at cryogenic temperatures.

FIG. 1A is a simplified diagram illustrating an example of an optical switch 100 including a Mach-Zehnder interferometer 120 according to certain embodiments. In the example shown in FIG. 1, optical switch 100 includes two input ports (input port 1 and input port 2) and two output ports (output port 1 and output port 2). The input ports and the output ports of optical switch 100 can be implemented, for example, using optical waveguides operable to support single-mode or multimode optical beams. Optical switch 100 can be implemented using Mach-Zehnder interferometer 120 integrated with a set of 50/50 beam splitters (or directional couplers), such as a first 50/50 beam splitter 105 and a second 50/50 beam splitter 107. As illustrated in FIG. 1, input port 1 and input port 2 may be optically coupled to first 50/50 beam splitter 105, which may receive light from input port 1 or input port 2. First 50/50 beam splitter 105 may, through evanescent coupling, direct about 50% of the input light from input port 1 into a first waveguide 110 and about 50% of the input light from input port 1 into a second waveguide 112. Similarly, first 50/50 beam splitter 105 may direct about 50% of the input light from input port 2 into first waveguide 110 and about 50% of the input light from input port 2 into second waveguide 112. Thus, input light from an input port may be approximately evenly split and directed to first waveguide 110 and second waveguide 112.

Mach-Zehnder interferometer 120 may include a phase adjustment section 122 that includes a waveguide 124 and electrodes 126. A voltage signal $V_0$ can be applied across waveguide 124 through electrodes 126 in phase adjustment section 122 to adjust the refractive index of waveguide 124 and thus the phase delay of the light after passing through phase adjustment section 122. Because light in first waveguide 110 and second waveguide 112 is in-phase after propagation through first 50/50 beam splitter 105, phase adjustment in phase adjustment section 122 can introduce a predetermined phase difference between the light propagating in waveguides 130 and 132. As will be evident to one of skill in the art, the phase relationship between the light propagating in waveguides 130 and 132 can result in output light being present at output port 1 (e.g., when light beams are in-phase) or at output port 2 (e.g., when light beams are out of phase), thereby providing switch functionality as light is directed to output port 1 or output port 2 based on the voltage signal $V_0$ applied at phase adjustment section 122. Although a single active arm is illustrated in FIG. 1, both arms of Mach-Zehnder interferometer 120 can include phase adjustment sections in some other embodiments.

As illustrated in FIG. 1, electro-optic switch technologies, in comparison to all-optical switch technologies, apply electrical bias (e.g., voltage signal $V_0$ in FIG. 1) across the active region of the switch to produce optical variations. The electric field or current resulted from the application of the bias voltage can cause changes in one or more optical properties of the active region, such as the refractive index or light absorption. In addition to the power dissipated by current flow (in the cases where a current results from the application of the bias voltage), energy may also be dissipated by the creation of the electric field, which may have an energy density of $E^2\kappa/8\pi$ (cgs units), where E is the electric field and κ is the dielectric constant.

Although one example of Mach-Zehnder interferometer implementation is illustrated in FIG. 1, other switch architecture and/or other phase adjustment devices can be used in various embodiments, including ring resonator designs, disk resonator designs, Mach-Zehnder modulators, generalized Mach-Zehnder modulators, and the like. One of ordinary skill in the art would recognize many variations, modifications, and alternatives.

The phase adjustment described above can be achieved using EO effects such as the Pockels effect and/or Kerr effect. The Pockels effect changes or produces birefringence in an optical medium experiencing an electric field, where the birefringence is proportional to the applied electric field. The Pockels effect may occur in crystals that lack inversion symmetry, such as perovskite crystals, ferroelectric crystals, or other non-centrosymmetric media such as electric-field poled polymers or glasses. In the Kerr effect, the refractive index change (or birefringence) is proportional to the power (e.g., square) of the applied electric field. All materials can have a Kerr effect, but some materials may have higher Kerr effects than others. In general, the Pockels effect can be much higher EO effect than the Kerr effect.

Ferroelectric crystals generally have a spontaneous polarization that can be reoriented by an electric field or stress. The spontaneous polarization may be induced by a non-centrosymmetric crystal structure that may be stable over certain temperature ranges. Some examples of the ferroelectric crystals that have Pockels effect include $BaTiO_3$ (BTO), $(Ba,Sr)TiO_3$ (BST), $(Pb(Zr,Ti)O_3$ (PZT), $(Pb, La)(Zr,Ti)O_3$ (PLZT), $(Sr,Ba)Nb_2O_6$ (SBN), and the like. For example, barium titanate (BTO) has a relatively large Pockels coefficient at room temperature. In addition, BTO can be grown on large Si substrates, and can be integrated in Si photonic platforms using silicon CMOS processes. Thus, BTO can be used in a variety of electronic applications due to its excellent ferroelectric properties, high dielectric constant, low dielectric loss, chemical and mechanical stability, and CMOS process compatibility.

Figure 1B:
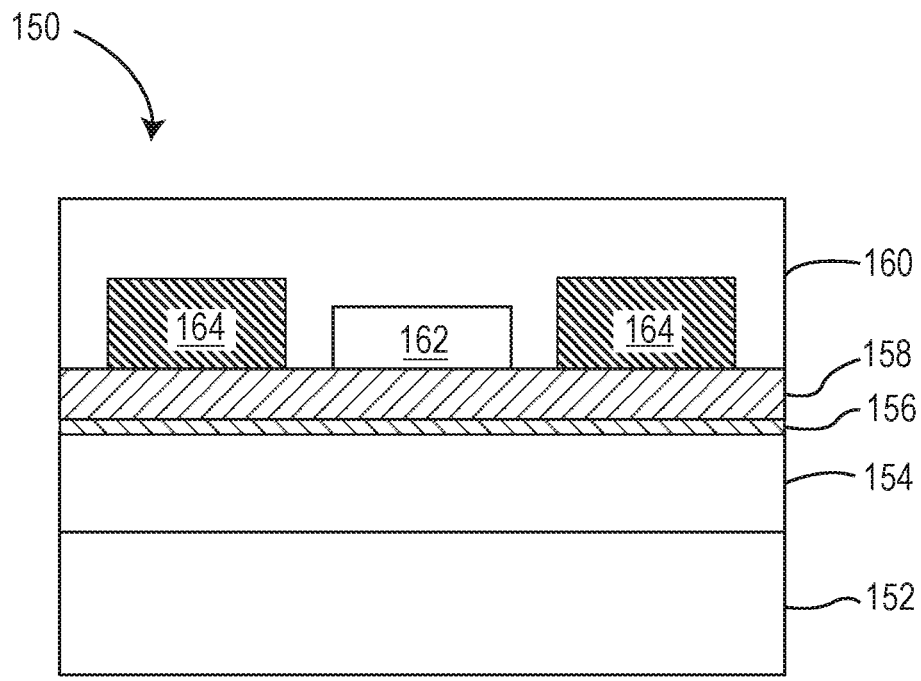
FIG. 1B is a cross-sectional view of an example of a phase adjustment section in an implementation of the optical switch illustrated in FIG. 1A, according to certain embodiments.

FIG. 1B is a cross-sectional view of an example of a phase adjustment section 150 (e.g., phase adjustment section 122) in an implementation of the optical switch 100 illustrated in FIG. 1A according to certain embodiments. Phase adjustment section 150 may use EO effects, such as the Pockels effect described above. Phase adjustment section 150 may include a substrate 152, an optional buffer layer 154, a seed layer 156, an EO material layer 158, a waveguide core 162, a waveguide cladding layer 160, and electrodes 164. EO material layer 158 may have a high Pockels coefficient, and may include, for example, perovskite ferroelectrics or other ferroelectric crystals, such as barium titanate ($BaTiO_3$ or BTO) described herein.

Substrate 152 may include a semiconductor substrate, such as a silicon wafer, a germanium wafer, a germanium-on-silicon wafer, a silicon-on-insulator (SOI) wafer, or the like. Seed layer 156 may have a lattice structure similar to the lattice structure of EO material layer 158, and may include, for example, MgO, $BaHfO_3$, $BaZrO_3$, $LaAlO_3$, $SrHfO_3$, $SrTiO_3$, $SrMoO_3$, or $SrZrO_3$. Seed layer 156 can be deposited (e.g., epitaxially grown) on substrate 152. In some embodiments, a buffer layer 154 may be positioned between seed layer 156 and substrate 152. Buffer layer 154 may include, for example, an oxidized layer of the substrate, such as a $SiO_2$ layer. In one example, buffer layer 154 (e.g., $SiO_2$) may be formed by high temperature oxidation annealing of seed layer 156 (e.g., $SrTiO_3$) and substrate 152 (e.g., Si) in an oxygen environment.

EO material layer 158 may be epitaxially deposited on seed layer 156. Waveguide core 162 may be formed directly on top of EO material layer 158 through, for example, deposition and photolithography, or indirectly on EO material layer 158 with a buffer layer between EO material layer 158 and waveguide core 162. This buffer layer can be used to prevent interaction between EO material layer 158 and waveguide core 162, and/or serves as an etch-stop layer for the formation of waveguide core 162. Waveguide core 162 may include, for example, Si, SiN, SiGe, an EO material (e.g., BTO), or the like. Waveguide cladding layer 160 may include a dielectric material that has a refractive index lower that the refractive index of waveguide core 162, such as an oxide, nitride, or oxynitride, oxycarbide, or the like (e.g., $SiO_2$, $Si_3N_4$, SiON, SiCO, etc.) and can be deposited on waveguide core 162. Trenches may be etched in waveguide cladding layer 160 and filled with a conductive material, such as a metal, to form electrodes 164. Electrodes 164 can be used to apply bias voltage and thus electric field across EO material layer 158 to modulate its refractive index for phase adjustment.

As described above, some perovskite ferroelectrics, such as barium titanate, may have large Pockels coefficients at room temperature. The Pockels coefficient of a perovskite ferroelectric material may be different for different crystal lattice orientations. In addition, the Pockels coefficient of the perovskite ferroelectric material may be different at different operation temperatures. For example, at low temperature, the Pockels coefficient of a ferroelectric material may reduce significantly.

Figure 2:
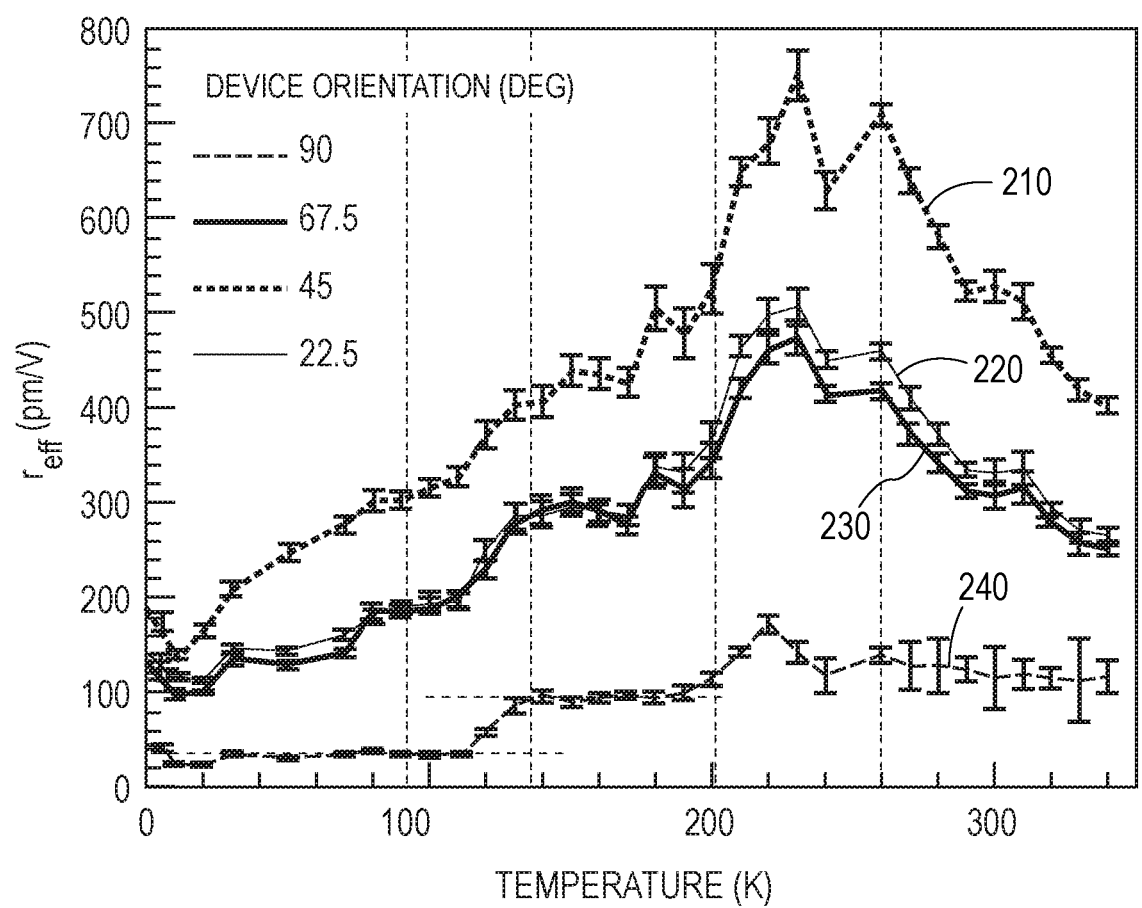
FIG. 2 illustrates effective Pockels coefficients for an $ABO_3$ perovskite crystal (e.g., a $BaTiO_3$ crystal) with different crystal lattice orientations at temperatures from about 4 K to about 340 K, according to certain embodiments.

FIG. 2 illustrates effective Pockels coefficients for $BaTiO_3$ with different crystal lattice orientations at temperatures from about 4 K to about 340 K as reported in, for example, Felix Eltes et al., "*An integrated Cryogenic Optical Modulator*," J. App. Phys. (2019). In FIG. 2, the x axis corresponds to the operation temperatures between 4 K and 340 K, and they axis corresponds to the Pockels coefficient (in pm/V). A curve 210 shows the corresponding Pockels coefficients at different temperatures for a BTO layer with a 45° lattice orientation. A curve 220 shows the corresponding Pockels coefficients at different temperatures for a BTO layer with a 22.5° lattice orientation. A curve 230 shows the corresponding Pockels coefficients at different temperatures for a BTO layer with a 67.5° lattice orientation. A curve 240 shows the corresponding Pockels coefficients at different temperatures for a BTO layer with a 90° lattice orientation. Curves 210-240 show that the Pockels effect of BTO is anisotropic, and thus the EO effect may be a function of the orientation of the crystal lattice in the BTO layer in an EO device.

Curves 210-240 also show the temperature dependency of the Pockels coefficient. For example, FIG. 2 shows that, when the orientation of the crystal lattice in the BTO layer is at about 45°, the Pockels coefficient may be the highest between about 200 K and about 260 K, such as at about 240 K, where the Pockels coefficient can be greater than 700 pm/V. Below about 240 K, the magnitude of the Pockels coefficient may decrease gradually to about 200 pm/V at 4 K, which is less than ⅓ of the Pockels coefficient at room temperature. In addition, there may be a rapid decrease in Pockels coefficient at about 140 K to about 100 K.

While the Pockels coefficient of $BaTiO_3$ may decrease significantly at 4 K compared with its Pockels coefficient at room temperature, the value (e.g., about 200 pm/V) may still be larger than some other materials at room temperature. The effect of the reduced Pockels coefficient on the energy efficiency of EO switching may be partially compensated for by the reduction of the permittivity of $BaTiO_3$ at low temperatures. Additionally, the conductivity of $BaTiO_3$ may be reduced at low temperatures, which may help to reduce the static power consumption of $BaTiO_3$-devices in cryogenic environments.

To improve the performance of Pockels effect-based EO devices at cryogenic temperatures, it may be desirable to maintain the high room-temperature Pockels coefficients of the EO materials at cryogenic temperature. According to certain embodiments, it is determined that the reduction in the Pockels effect may be at least in part caused by the changes in the strain and polarization of the crystal with the changes in temperature and also the crystallographic phase and polarization transitions of the crystal at certain temperatures because, as described above, the Pockels effect may occur in crystals that lack inversion symmetry (e.g., non-centrosymmetric) and the non-zero elements of the Pockels tensor may depend on the crystal symmetry. As such, the Pockels coefficient of the EO material at cryogenic temperatures may be improved if the EO material can maintain its room-temperature crystal structure at cryogenic temperatures.

Figure 3A:
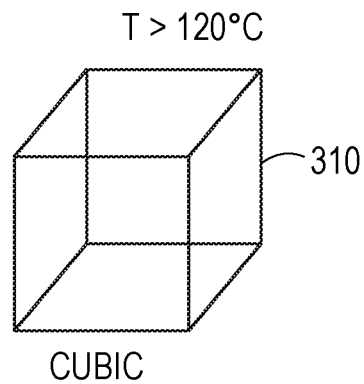
FIGS. 3A-3D illustrate phase transitions of $BaTiO_3$ at different temperatures, according to certain embodiments.

FIGS. 3A-3D illustrate crystallographic phase transitions of an $ABO_3$ perovskite crystal (e.g., $BaTiO_3$) at different temperatures. Barium titanate ($BaTiO_3$) may generally be in a paraelectric phase with no net polarization above the Curie temperature (e.g., at about 120° C.). FIG. 3A shows a cubic crystal structure 310 in BaTiO$_3$ above the Curie temperature. Barium ions (A ions), which are large in size, generally occupy the corner sites. Titanate ions (B ions), which are small in size, generally locate in the centers of the cube. Oxygen anions are generally on the face centers. Unlike many other oxide crystals, oxygen anions in the perovskite crystal may not form a close packing structure. Therefore, the crystal structure of perovskite crystals (e.g., BaTiO$_3$) may change due to temperature change and stress in the perovskite crystals. At about the Curie temperature, the crystal may undergo a phase transition (also referred to as a displacement phase transition) and may adopt a polar tetragonal phase within a temperature range from about 5° C. to about 120° C.

Figure 3B:
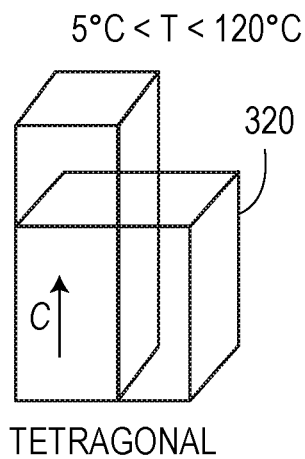

FIG. 3B shows a polar tetragonal crystal structure 320 in BaTiO$_3$ within a temperature range from about 5° C. to about 120° C. When cooled down from the Curie temperature, the polar tetragonal crystal structure 320 may be formed. The formation of the tetragonal structure may make the unit cells permanently polarized, which may lead to spontaneous polarization along the c-axis that may be parallel to any one of six equivalent <100> axes in cubic crystal structure 310. Thus, the polar tetragonal phase may have 6 stable polarization directions parallel to edges of the unit cell, resulting in 6 distinct crystal variants.

Figure 3C:
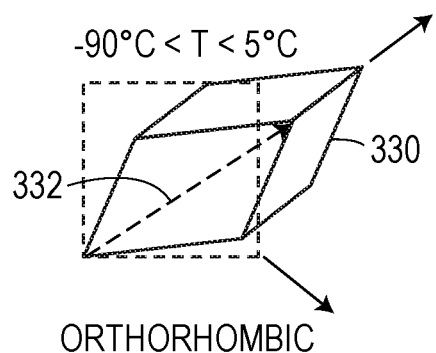

FIG. 3C illustrates an orthorhombic crystal structure 330 in BaTiO$_3$ within a temperature range from about –90° C. to about 5° C. As shown in FIG. 3C, upon further cooling below about 5° C., the unit cell of BaTiO$_3$ may further distort by elongating along a face diagonal (<110>) direction 332, and tetragonal crystal structure 320 may change to orthorhombic crystal structure 330. There may be 12 equivalent <110> directions in cubic crystal structure 310, which may result in 12 possible polar directions in the orthorhombic phase. The orthorhombic phase may be stable from about 5° C. down to about –90° C.

Figure 3D:
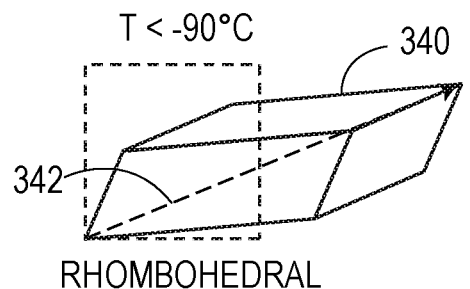

FIG. 3D illustrates a rhombohedral crystal structure 340 in BaTiO$_3$ at temperatures below about –90° C. As shown in FIG. 3D, upon further cooling below about –90° C., the unit cell of BaTiO$_3$ may undergo another distortion along the body diagonal (<111>) direction 342, resulting in a rhombohedral symmetry structure. There may be 8 equivalent polar directions in the rhombohedral phase along the <111> direction in the cubic crystal structure 310.

Thus, bulk BaTiO3 crystals may transition from the tetragonal phase at room temperature to the orthorhombic phase at or below about 270 K, and may then transition to the rhombohedral phase at or below about 180 K. Such crystal structures and phase transitions may be found in many perovskite ferroelectrics. The phase transitions can change the elements of the Pockels tensor and modify the magnitude of the effective Pockels coefficients.

As described above, the crystal structures and phase transitions may also affect the available polarization directions. At the microstructural level, regions with uniform electrical polarization may form domains, where each domain is a region that includes a single crystal variant. The interfaces between domains may be referred to as domain walls. Ferroelectric crystals may adopt a stable, minimum-energy arrangement of domains and domain walls. In many cases, a global minimum may not be achieved and the stable state may be a local energy minimum, and the energy minimization may result in crystals with multiple domains, separated by domain walls that are oriented to minimize energy by maintaining compatibility of strains and polarizations across the walls.

Thus, the Pockels coefficient of the EO material at cryogenic temperatures may be improved by maintaining the room-temperature crystal structure and the polarization direction at cryogenic temperatures. For example, according to certain embodiments, an EO material layer may include interleaved and interlocked thin EO material layers and interlayers. The interlayers may have lattice structures that do not change at the operation temperatures. Thus, the thin EO material layers interlocked to the interlayers may maintain their lattice structures and polarization directions and hence the EO coefficients, without experiencing the phase transitions when the operation temperature changes as described above with respect to FIGS. 3A-3D.

Figure 4:
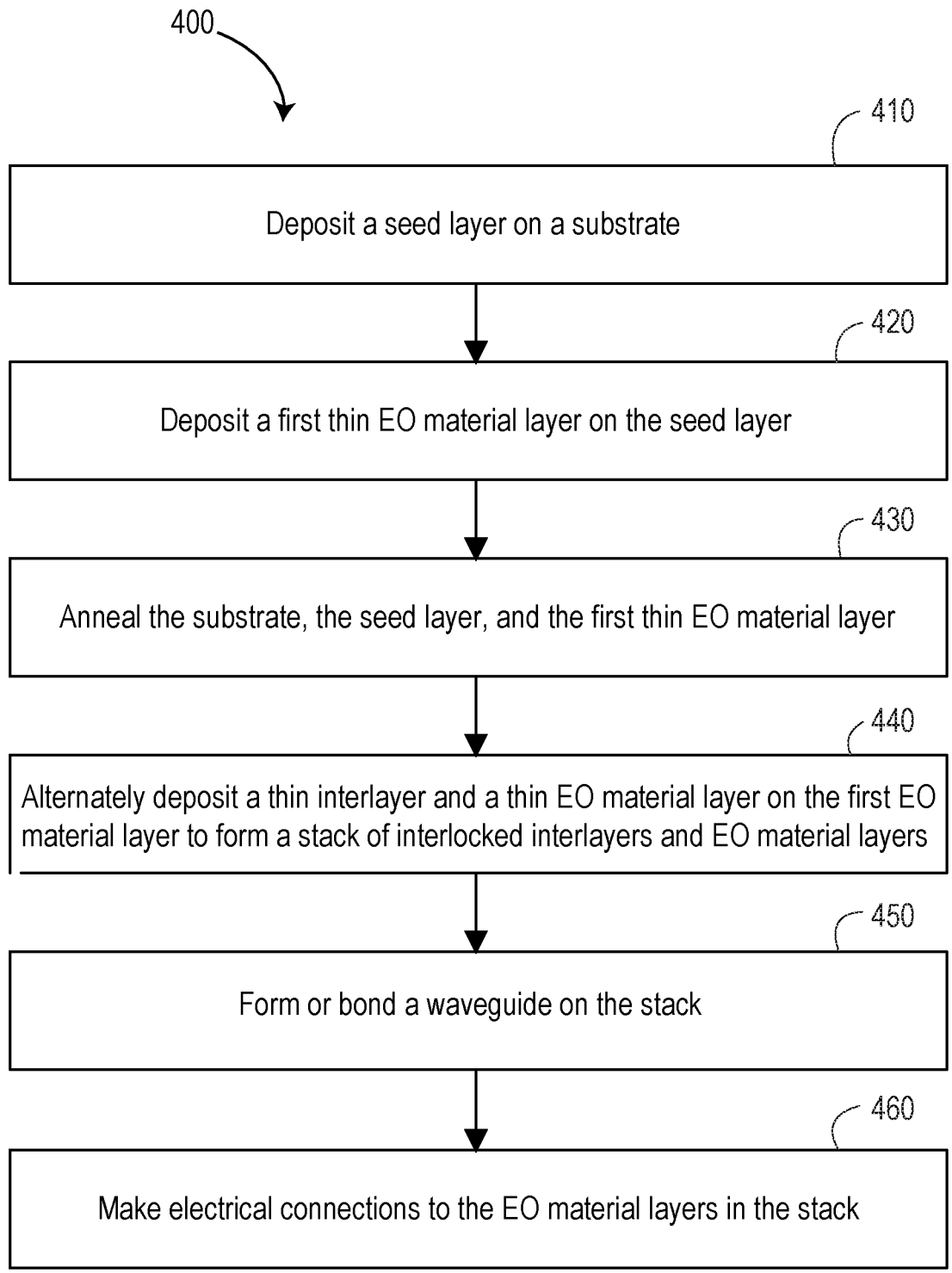
FIG. 4 is a simplified flow chart illustrating an example of a method for fabricating an EO device including an EO material layer characterized by a substantially constant EO coefficient from room temperature to cryogenic temperatures, according to certain embodiments.

FIG. 4 is a simplified flow chart 400 illustrating an example of a method for fabricating an EO device including an EO material layer characterized by a substantially constant EO coefficient from room temperature to cryogenic temperatures according to certain embodiments. Even though FIG. 4 describes the operations in a sequential flow, some of the operations may be performed in parallel or concurrently. Some operations may be performed in a different order. An operation may have additional steps not included in the figure. Some operations may be optional, and thus may be omitted in various embodiments. Some operations may be performed together with another operation.

At block 410, a seed layer (e.g., seed layer 156) may be deposited on a substrate (e.g., substrate 152). As described above, the substrate may be a semiconductor wafer, such as a single crystalline silicon wafer, a germanium wafer, a germanium-on-silicon wafer, a silicon-on-insulator (SOI) wafer, or the like. The substrate may include a semiconductor wafer of various sizes, such as 4-inch, 6-inch, 8-inch, 10-inch, 12-inch, or larger. In general, it is desirable to use a large wafer to improve the productivity. For example, a 12-inch silicon wafer may be used as the substrate.

The seed layer may have a lattice structure similar to the lattice structure of the EO material used in the EO device, and may include, for example, SrTiO$_3$ (STO), MgO, or LaAlO$_3$. The seed layer may be epitaxially deposited or grown on the substrate using, for example, molecular-beam epitaxy (MBE). In one embodiment, Sr and Ti may be deposited on the surface of a silicon wafer in an oxygen environment to form an amorphous SrTiO$_3$ layer, and the amorphous SrTiO$_3$ layer may crystalize at a higher temperature to form an epitaxial crystalline SrTiO$_3$ layer. The lattice mismatch between Si and STO may be about 2%, and high quality STO may be mostly coherent to silicon when the thickness of the STO layer is less than, for example, about 5 nm.

Figure 5A:
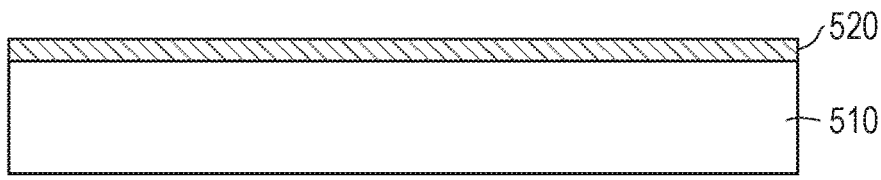
FIG. 5A illustrates an example of a substrate with a seed layer grown thereon, according to certain embodiments.

FIG. 5A illustrates an example of a substrate 510 (e.g., a semiconductor wafer) with an epitaxial seed layer 520 according to certain embodiments. In the example shown in FIG. 5, substrate 510 may include a silicon or SOI wafer. Epitaxial seed layer 520 may include a coherent epitaxial STO layer, which may have a thickness of, for example, few nanometers or a few tens of nanometers, such as less than about 8 nm or less than about 5 nm.

Referring back to FIG. 4, at block 420, a first thin EO material layer may be deposited on the seed layer by, for example, epitaxial deposition. The first thin EO material layer may include, for example, ferroelectric or perovskite ferroelectric materials, such as BaTiO$_3$ (BTO), (Ba,Sr)TiO$_3$ (BST), (Pb(Zr,Ti)O$_3$ (PZT), (Pb, La)(Zr,Ti)O$_3$ (PLZT), or the like. The first thin EO material layer may have a thickness less than, for example, 100 nm. The lattice mismatch between BTO and silicon may be about 4%, and a BTO layer may be partially coherent to Si/STO when the thickness of the BTO layer is less than about 100 nm, which may result in the compressive stress in the BTO layer. Thus, the first thin EO material layer (e.g., BTO) deposited on the seed layer may have an out-of-plane polarization due to compressive stress.

Figure 5B:
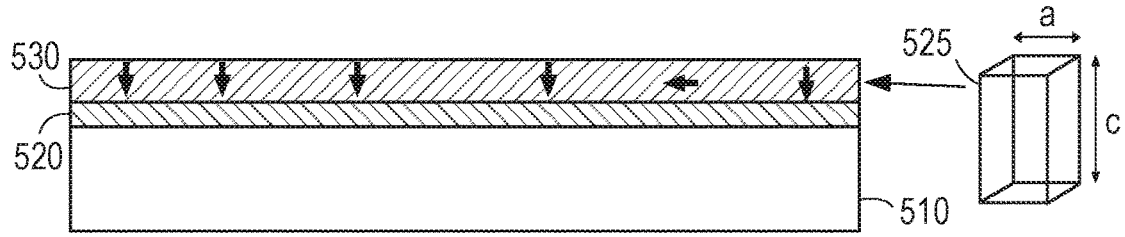
FIG. 5B illustrates the internal stress and crystal lattice orientation of a layer of a ferroelectric material epitaxially deposited on the seed layer, according to certain embodiments.

FIG. 5B illustrates the internal stress and crystal lattice orientation of an layer 530 of an EO material epitaxially deposited on seed layer 520 according to certain embodiments. As described above, the EO material may include, for example, $BaTiO_3$ (BTO), $(Ba,Sr)TiO_3$ (BST), $(Pb(Zr,Ti)O_3$ (PZT), $(Pb, La)(Zr,Ti)O_3$ (PLZT), or the like. As deposited, layer 530 of the EO material (e.g., BTO on STO/Si) may mostly include domains having a tetragonal structure 525, where the c-direction of tetragonal structure 525 is perpendicular to layer 530 (i.e., out-of-plane polarization), due to compressive stress as illustrated in FIG. 5B. Layer 530 may be a thin layer, such as less than 100 nm or thinner, in order for the ferroelectric material in layer 530 to lock to an interlayer having a tetragonal structure at low temperatures.

At block 430 in FIG. 4, the substrate, the seed layer, and the first thin EO material layer may be annealed in an oxygen environment at a higher temperature, such as at above the melting point of $SiO_2$. For example, the annealing temperature may be above 600° C., such as 750° C. or higher. The high temperature annealing may help to release stress and form a buffer layer at the interface between the substrate (e.g., Si) and the seed layer (e.g., STO). The buffer layer may include an oxide layer, such as a $SiO_2$ layer. For example, the silicon at the interface between the substrate and the seed (e.g., STO) layer may be oxidized at the high annealing temperature and oxygen environment to form a $SiO_2$ layer. When the annealing temperature is above the melting point of the buffer layer (e.g., about 600° C.), the buffer layer (e.g., $SiO_2$) may soften, and thus the seed layer and the first thin EO material layer may be decoupled from the substrate and may be allowed to release the stress in the seed layer and the first thin EO material layer. Therefore, the stress in the EO material (e.g., BTO) may change from compressive to natural stress due to $SiO_2$ softening during the high temperature annealing, and the quality of the seed layer and the first thin EO material layer may be improved.

There may be a large difference in the coefficient of thermal expansion (CTE) between BTO (e.g., about 3.5E-6/° C.) and silicon (e.g., about 2.6E-6/° C.) at high temperatures. Thus, when the buffer layer (e.g., $SiO_2$) hardens at below 550° C. during cool down, the large CTE difference between silicon and BTO may cause the stress in BTO to undergo natural to tensile stress transition. As such, at room temperature, the net or dominant stress in BTO may have been changed from compressive stress to tensile stress, which may cause the polarization to change form the out-of-plane polarization to the in-plane orientation. Therefore, the annealing temperature can be selected such that the BTO may under tensile stress and may have in-plane polarization after cooling due to stress caused by the large difference in CTE between BTO and silicon.

Figure 5C:
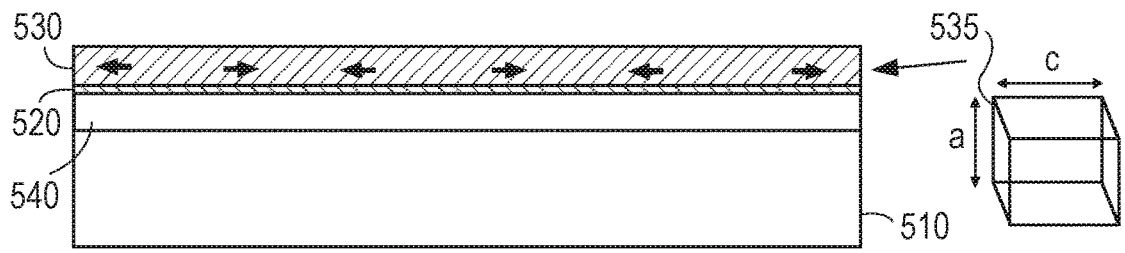
FIG. 5C illustrates the internal stress and crystal lattice orientation of the layer of the ferroelectric material epitaxially deposited on the seed layer after high temperature oxidation annealing, according to certain embodiments.

FIG. 5C illustrates the internal stress and crystal lattice orientation of layer 530 of the EO material epitaxially deposited on seed layer 520 after high temperature oxidation annealing according to certain embodiments. As illustrated, due to the tensile stress in layer 530 after annealing as described above, layer 530 of the ferroelectric material (e.g., BTO on STO/Si) may mostly include domains having a tetragonal structure 535 where the c-direction of tetragonal structure 535 is parallel to layer 530 (i.e., in-plane polarization). FIG. 5C also shows a buffer layer 540, such as an oxide layer (e.g., $SiO_2$) formed by the oxidation of the substrate during the high temperature oxidation annealing.

Figure 6:
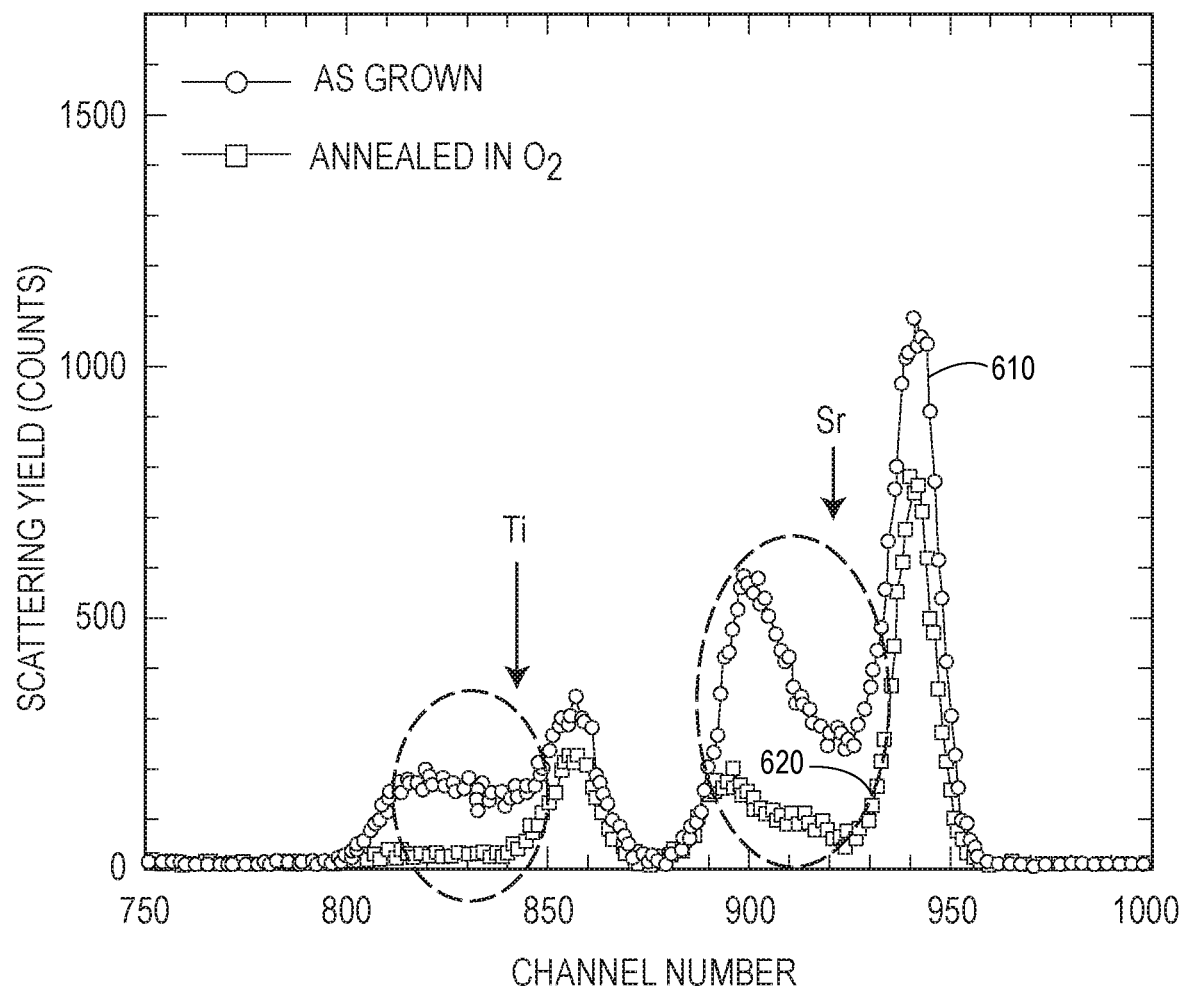
FIG. 6 illustrates crystal quality improvement after annealing shown by ion channeling for an example of an epitaxial layer before and after annealing, according to certain embodiments.

FIG. 6 illustrates crystal quality improvement after annealing shown by ion channeling measured using Rutherford backscattering spectroscopy (RBS)/channeling for an example of an epitaxial layer (e.g., a $SrTiO_3$ epitaxial layer) before and after annealing according to certain embodiments. In RBS/channeling, atoms displaced from their lattice sites may interact with the channeled beam, leading to an increase in scattering yield. A curve 610 in FIG. 6 shows the total numbers of detected backscattered particles (e.g., ions) in different channels (energy of backscattered particles) backscattered by a $SrTiO_3$ epitaxial layer before annealing. As illustrated, before annealing, the $SrTiO_3$ epitaxial layer includes many displaced Sr and Ti atoms. A curve 620 in FIG. 6 shows the total numbers of detected backscattered particles in different channels backscattered by the $SrTiO_3$ epitaxial layer after annealing. Curve 620 shows that the number or percentage of displaced Sr and Ti atoms is significantly reduced and thus the quality of the crystalline $SrTiO_3$ epitaxial layer is significantly improved. Even though not shown in FIG. 6, the quality of the BTO epitaxial layer may similarly be improved by the annealing process.

Figure 7:
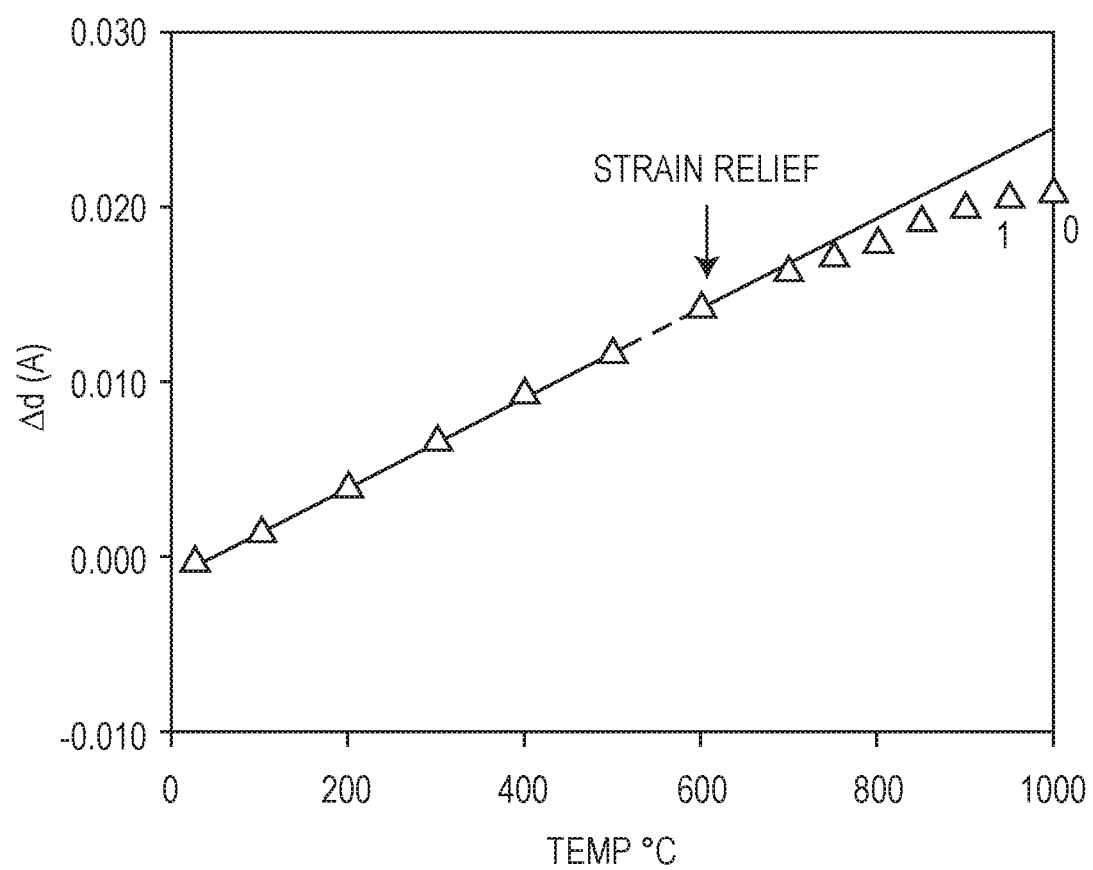
FIG. 7 illustrates examples of x-ray diffraction data showing out-of-phase lattice constant relaxing in an example of an epitaxial layer at high temperatures, according to certain embodiments.

FIG. 7 illustrates examples of x-ray diffraction data showing out-of-phase lattice constant relaxing of an example of an epitaxial layer (e.g., a $SrTiO_3$ epitaxial layer) at high temperatures. The $SrTiO_3$ epitaxial layer may be deposited on a silicon wafer using, for example, MBE. FIG. 7 shows that, at temperatures below about 600° C., the out-of-phase thermal lattice expansion may be a linear function of the temperature. The out-of-phase lattice constant may start to relax at about 600° C., which indicates that the STO is under compressive stress below about 600° C., and the compressive stress may be released at temperatures above 600° C.

Referring back to FIG. 4, at block 440, a thin interlayer may be deposited on the first EO material layer (e.g., a BTO layer), and a thin EO material layer (e.g., another BTO layer) may be deposited on the interlayer. The interlayer and the EO material layer may also be annealed using high temperature oxidation annealing as described above to relax BTO, improve crystal quality, and ensure the in-plane polarization in the thin BTO layer. A thin interlayer and a thin EO material layer may be alternately deposited and annealed in each of multiple process cycles to form a stack of interleaved and interlocked interlayers and EO material layers, until the total thickness of the EO material layers reaches a target thickness.

In various embodiments, the interlayer may include a crystal structure similar to the crystal structure of the EO material and may not undergo phase transitions at low temperatures. Thus, at the cryogenic temperature, the interlayer may have a crystal structure similar to the room-temperature crystal structure of the EO material. The interlayer may include certain oxides, such as, for example, MgO, BST, $BaHfO_3$, $BaZrO_3$, $SrHfO_3$, $SrNbO_3$, $SrZrO_3$, or other oxides with lattice constants close to the lattice constant of the tetragonal crystal structure of BTO. The interlayer can restrict the transition of BTO from its tetragonal phase at room temperature to other phases at lower temperatures.

Figure 5D:
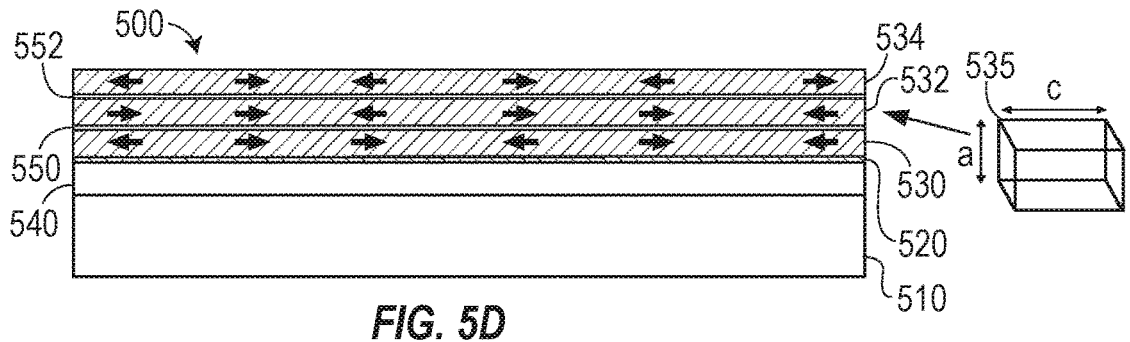
FIG. 5D illustrates the internal stress and crystal lattice orientation of layers of the ferroelectric material interleaved with interlayers in an engineered wafer, according to certain embodiments.

FIG. 5D illustrates the internal stress and crystal lattice orientation of layers of EO materials interleaved with interlayers in an example of an engineered wafer 500 according to certain embodiments. In the example shown in FIG. 5D, engineered wafer 500 may include substrate 510 (e.g., a silicon wafer), buffer layer 540 (e.g., a $SiO_2$ buffer layer), seed layer 520 (e.g., an STO layer with a thickness less than about 8 nm), and a plurality of thin EO material layers 530, 532, 534, and the like, such as thin BTO layers each with a thickness less than about 100 nm. Between the plurality of thin EO material layers 530, 532, and 534 are a plurality of interlayers 550, 552, and the like, such as layers of MgO, BST, BaHfO$_3$, BaZrO$_3$, SrHfO$_3$, SrZrO$_3$, SrNbO$_3$, or other oxides. Each interlayer 550 or 552 may have a thickness less than, for example, about 10 nm, and may be used to separate the thin BTO layers from each other and to impose tensile stress on the thin BTO layers. In some embodiments, the ratio between the thickness of each EO material layer and the thickness of each interlayer may be less than about 20:1, 10:1, 8:1, 5:1, or lower. The net or dominant stress in the layers of the EO material may be tensile stress. As described above, the stack of layers including the interleaved interlayers and thin EO material layers may have been annealed in high temperature annealing to relax the EO material, improve the material quality, and ensure the in-plane polarization in the EO material layers (e.g., the c-axis of the crystal structure is parallel to the EO material layers) as shown by tetragonal structure 535.

As also described above, the stack of interleaved and interlocked thin EO material layers and interlayers (e.g., BTO/MgO stack) may maintain the tensile stress in the EO material at low temperatures, thus maintaining tetragonal structure 535 of the EO material at low temperatures (e.g., a cryogenic temperature) due to the tensile stress. As such, the EO effect, such as the Pockels effect, of the EO material at the cryogenic temperature may be close to the Pockels effect of the EO material at room temperature.

At block 450, a waveguide may be formed on or bonded to the stack of interleaved thin EO material layers and interlayers. For example, in some embodiments, a waveguide layer, such as a silicon, SiGe, or Si$_3$N$_4$ layer, may be deposited directly on the stack, the silicon, SiGe, or Si$_3$N$_4$ layer may be patterned using photolithography to form a waveguide core, and a cladding layer (also referred to as a capping layer) may then be deposited on the waveguide core to form the waveguide. A silicon, SiGe, or Si$_3$N$_4$ layer may be deposited indirectly on the stack with a buffer layer in between. The buffer layer may prevent the interaction between the waveguide core and the EO material, and/or serves as an etch stop layer for patterning the waveguide layer. In some embodiments, the waveguide core and the upper- and/or under-cladding layers may be formed on a second substrate and may then be bonded to the stack of interleaved thin EO material layers and interlayers (e.g., engineered wafer 500), where the substrate of engineered wafer 500 may later be removed by, for example, horizontal wet etching (e.g., using a sacrificial layer) or other lift-off techniques, such as laser lift-off techniques. In some embodiments, some of the thin EO material layers may be used to form the waveguide core.

The cladding layer of the waveguide may include a dielectric material or an EO material that has a refractive index lower than the refractive index of the waveguide core. The cladding layer may be include, for example, Si$_3$N$_4$, an oxide (e.g., SiO$_2$, Al$_2$O$_3$, and MgO), high-κ materials (e.g., hafnium oxide (HfO$_2$), or the like. In some embodiments, an amorphous dielectric cladding layer with compressive stress (e.g., Si$_3$N$_4$, SiO$_2$, Al$_2$O$_3$, etc.) may be deposited on the stack of interleaved thin EO material layers and interlayers at temperatures below about 550° C. The cladding layer may apply a tensile stress on the stack of interleaved thin EO material layers and interlayers to further maintain the tetragonal phase of the EO material. The cladding layer may also be used as a dielectric layer for wafer-to-wafer bonding or die-to-wafer bonding. In some embodiments, the cladding layer may be used as an etch stop layer for certain etch processes. Some examples of waveguide structures and EO device configurations using the stack of interleaved thin EO material layers and interlayers are described in detail below.

Figure 5E:
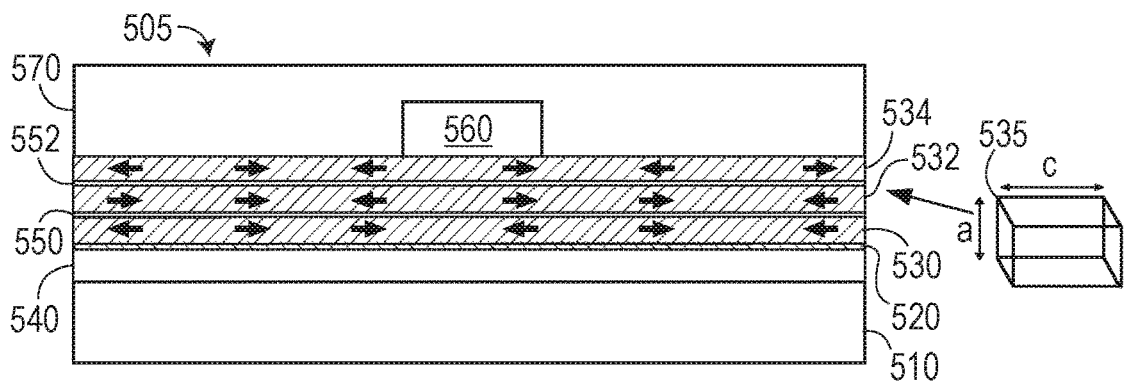
FIG. 5E illustrates the internal stress and crystal lattice orientation of layers of the ferroelectric material interleaved with interlayers in a waveguide structure, according to certain embodiments.

FIG. 5E illustrates the internal stress and crystal lattice orientation of layers of the EO material interleaved with interlayers in a waveguide structure 505 according to certain embodiments. As illustrated, a waveguide core 560 may be adjacent to engineered wafer 500 and may be covered by a waveguide cladding layer 570. Waveguide cladding layer 570 may include an amorphous dielectric cladding layer (e.g., Si$_3$N$_4$, SiO$_2$, Al$_2$O$_3$, etc.) and may apply tensile stress on the stack of thin EO material layers to maintain the tetragonal phase of the EO material at low temperatures. For example, SiO$_2$ and BTO may have very different CTE characteristics at low temperatures (e.g., cryogenic temperatures), where the CTE of SiO$_2$ may become negative (i.e., expand as temperature decreases) at low temperatures. Thus, when being cooled to cryogenic temperatures, the SiO$_2$ cladding layer may apply tensile stress on the BTO layers due to the large difference in CTE between BTO layers and the SiO$_2$ cladding layer. Therefore, the dominant stress in the layers of the EO material may be tensile stress at temperatures from the room temperature to the cryogenic temperatures. As such, the layers of the EO material may maintain the tetragonal crystal structure and in-plane polarization, where the c-axis of the crystal structure may be parallel to the EO material layers.

At block 460, electrical connections may be made to the EO material layers in the stack in order to apply a voltage signal to the EO material layers. For example, trenches may be etched in the cladding layer and through the EO material layers in the stack, a layer of thin conductive liner material, such as TiN or Ti and TiN, may first be coated at the trench sidewalls to promote adhesion and prevent diffusion, and then a conductive electrode material (e.g., W or Co) may fill the trenches to form the electrodes for the EO device. Alternatively, a conductive barrier material (e.g., TaN) and liners (e.g., Ta, Co, or Ru) are first coated at the trench sidewall to deposit Cu conductive electrodes. In this way, each of the EO material layers may be in contact with the electrodes and may receive the voltage signal to change its refractive index due to the electrical field induced by the voltage signal.

Figure 8:
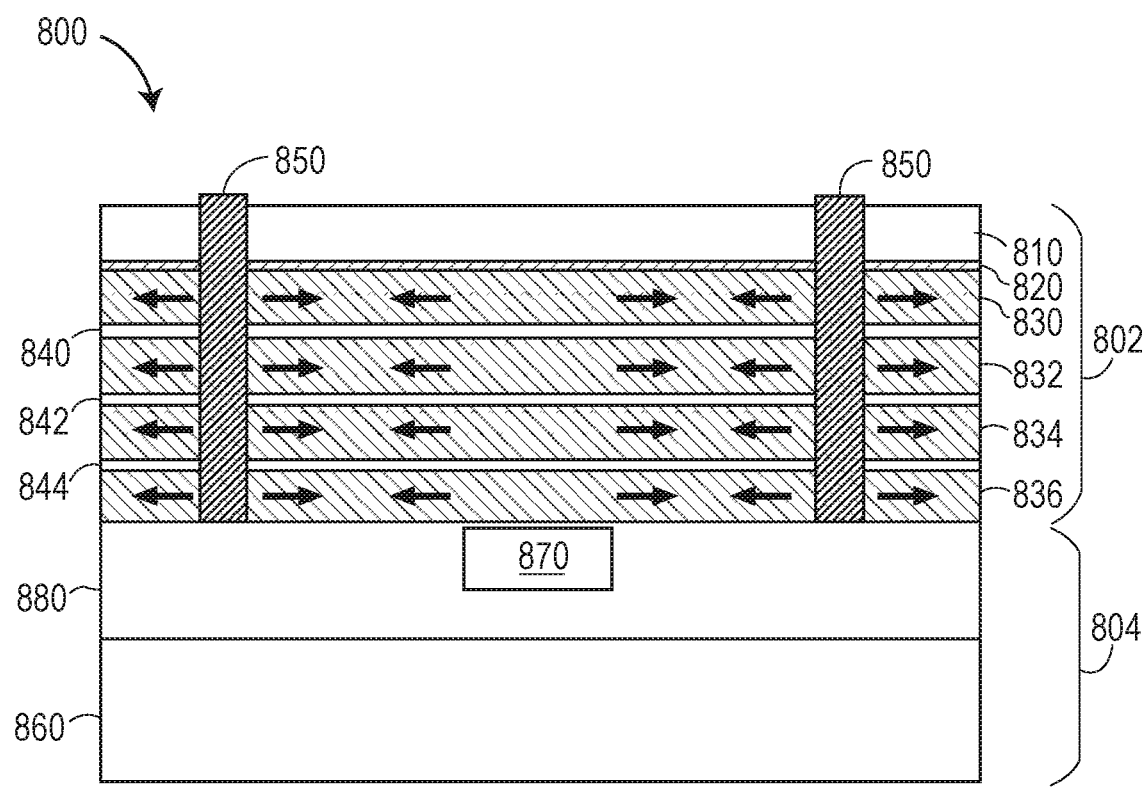
FIG. 8 is a simplified cross-sectional view of an example of a waveguide structure including an EO material layer that maintains a tetragonal phase at cryogenic temperatures, according to certain embodiments.

FIG. 8 is a simplified cross-sectional view of an example of a waveguide structure 800 including EO material layers that can maintain a tetragonal phase at cryogenic temperatures according to certain embodiments. Waveguide structure 800 may include a first portion 802 and a second portion 804 that are bonded together by, for example, wafer-to-wafer fusion bonding. First portion 802 may include a stack of thin EO material layers 830, 832, 834, and 836 interleaved with thin interlayers 840, 842, and 844. As described above with respect to FIG. 4 and FIGS. 5B-5D, EO material layers 830, 832, 834, and 836 may include ferroelectric crystals, such as BaTiO$_3$ (BTO), (Ba,Sr)TiO$_3$ (BST), (Pb(Zr,Ti)O$_3$ (PZT), (Pb, La)(Zr,Ti)O$_3$ (PLZT), and the like. Interlayers 840, 842, and 844 may include, for example, MgO, BST, BaHfO$_3$, BaZrO$_3$, SrHfO$_3$, SrNbO$_3$, SrTiO$_3$, SrZrO$_3$, or other oxides.

The EO material layers and the interlayers may be formed alternately such that the EO material layers and the interlayers may interleave and interlock with each other to form the stack of interleaved layers. The EO material layers and the interlayers may be thin layers, where the ratio between the thickness of each EO material layer and the thickness of each interlayers may be less than about 20:1, 10:1, 8:1, 5:1, or lower. In one example, the thickness of each EO material layer may be about 100 nm or thinner, and the thickness of each interlayer may be about 10 nm or thinner. The total thickness of the multiple EO material layers in the stack may be larger than a certain value, such as greater than about 300 nm. The stack of interleaved layers may be formed on a seed layer 820, which may in turn be deposited on, for example, a semiconductor substrate (e.g., a silicon substrate) (not shown in FIG. 8) as described above. A buffer layer 810 may be formed between seed layer 820 and the semiconductor substrate using, for example, the high temperature oxidation annealing process described above.

Second portion 804 may include a waveguide formed on a substrate 860, which may be a semiconductor substrate (e.g., a silicon handle wafer) or a glass, quartz, ceramic, or metal substrate. The waveguide may include a waveguide core 870 and a waveguide cladding layer 880. Waveguide core 870 may include a material having a high refractive index, such as silicon, SiN, SiGe, or the like. Waveguide cladding layer 880 may include a dielectric material that may have a refractive index lower than the refractive index of waveguide core 870. Waveguide cladding layer 880 may include, for example, an amorphous dielectric cladding layer of $Si_3N_4$, $SiO_2$, $Al_2O_3$, MgO, SiON, SiCN, SiCON, SiCO, or the like. Waveguide cladding layer 880 may be used as a dielectric layer for wafer-to-wafer bonding and die transfer. When bonded to first portion 802, waveguide cladding layer 880 may apply a tensile stress on the stack of interleaved thin EO material layers and interlayers to maintain the tetragonal phase of the EO material at low temperatures as described above. Second portion 804 of waveguide structure 800 may also include other passive or active devices formed on top of substrate 860.

After first portion 802 and second portion 804 are bonded together, the semiconductor substrate on which the stack of thin EO material layers 830, 832, 834, and 836 and thin interlayers 840, 842, and 844 are formed may be thinned or removed by, for example, back lapping, back grinding, horizontal wet etching, lift-off techniques (e.g., laser lift-off techniques), and the like. Trenches may then be etched in first portion 802 from buffer layer 810 side down to the interface between first portion 802 and second portion 804, where waveguide cladding layer 880 may be used as the etch stop layer for the etch process. Conductive materials, such as Ti, TiN, and TaN, together with electrode metals (e.g., Cu, W, Co, etc.), may be deposited or otherwise fill the trenches and form electrodes 850.

Electrodes 850 may be used to apply voltage signals to thin EO material layers 830, 832, 834, and 836 through edge contacts, rather than surface contacts. The edge contacts may apply voltage signals directly to the EO material layers without going through the interlayers, which may have a dielectric constant different from the dielectric constant of the EO material. For example, MgO may have a lower dielectric constant than BTO. Thus, the edge contacts may help to eliminate field interference caused by the interlayers due to the difference in dielectric constant. In some embodiments, the interlayers (e.g., BST layers) may have a dielectric constant similar to the dielectric constant of the EO material (e.g., BTO), and surface contacts may be used to apply the voltage signals to the EO material layers.

Figure 9:
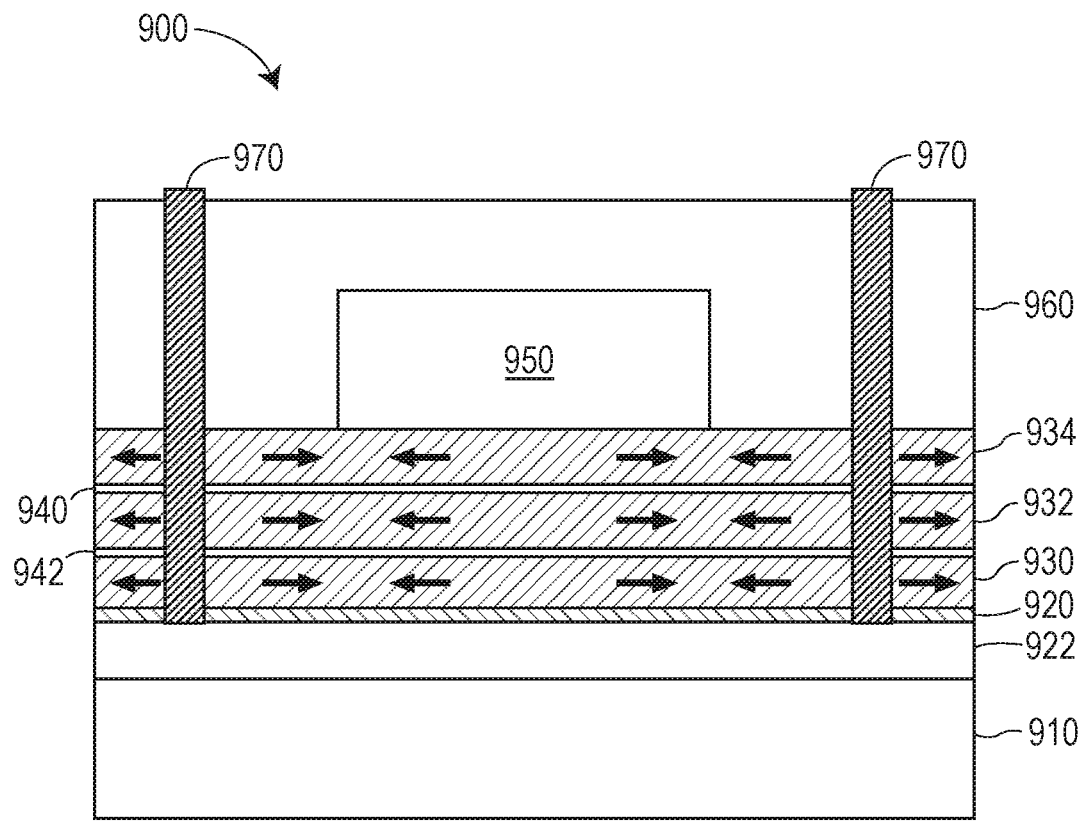
FIG. 9 is a simplified cross-sectional view of another example of a waveguide structure including an EO material layer that maintains a tetragonal phase at cryogenic temperatures, according to certain embodiments.

FIG. 9 is a simplified cross-sectional view of another example of a waveguide structure 900 including EO material layers that can maintain a tetragonal phase at cryogenic temperatures according to certain embodiments. Waveguide structure 900 may include a substrate 910, which may be similar to substrate 152 or 510 described above. In one example, substrate 910 includes a large (e.g., 12") silicon wafer. Waveguide structure 900 may also include a buffer layer 922 and a seed layer 920 on substrate 910. Buffer layer 922 may be similar to buffer layer 154, 540, or 810 described above. One example of buffer layer 922 is a $SiO_2$ layer. Seed layer 920 may be similar to seed layer 156, 520, or 820 described above. One example of seed layer 920 is a STO layer. As described above, buffer layer 922 may be formed by the high temperature oxidation annealing of seed layer 920 deposited on substrate 910 (e.g., silicon wafer), where substrate 910 may be oxidized at the interface between seed layer 920 and substrate 910 to form buffer layer 922 between seed layer 920 and substrate 910.

Waveguide structure 900 may include multiple EO material layers 930, 932, 934, and the like, and multiple interlayers 940, 942, and the like. As described above, EO material layers 930, 932, and 934 may include ferroelectric crystals, such as BaTiO3 (BTO), (Ba,Sr)TiO3 (BST), (Pb (Zr,Ti)O3 (PZT), (Pb, La)(Zr,Ti)O3 (PLZT), and the like. Interlayers 940 and 942 may include, for example, MgO, BST, $BaHfO_3$, $BaZrO_3$, $SrHfO_3$, $SrNbO_3$, $SrTiO_3$, $SrZrO_3$, or other oxides. The EO material layers and the interlayers may be deposited alternately on top of seed layer 920, such that the EO material layers and the interlayers may interleave and interlock with each other to form a stack of interleaved layers. The EO material layers and the interlayers may be thin layers, where the ratio between the thickness of each EO material layer and the thickness of each interlayer may be less than about 20:1, 10:1, 8:1, 5:1, or lower. In one example, the thickness of each EO material layer may be about 100 nm or thinner, and the thickness of each interlayers may be about 10 nm or thinner. The total thickness of the multiple EO material layers in the stack may be larger than a certain value, such as greater than about 300 nm.

A waveguide including a waveguide core 950 and a cladding layer 960 may be formed on the stack of interleaved layers as described above with respect to, for example, block 450 of FIG. 4 and FIG. 5E. Waveguide core 950 may include, for example, Si, SiGe, or SiN, and cladding layer 960 may include, for example, $Si_3N_4$, $SiO_2$, $Al_2O_3$, MgO, SiCN, SiON, SiCO, $HfO_2$, or the like.

Trenches may then be etched in cladding layer 960 and the stack of interleaved layers from cladding layer 960 down to seed layer 920 or buffer layer 922, which may be used as the etch stop layer for the etch process. Conductive materials, such as metals (e.g., Cu, W, Co, etc.), may be deposited or otherwise fill the trenches and form electrodes 970. As described above with respect to FIG. 8, electrodes 970 may be used to apply voltage signals to EO material layers 930, 932, and 934 through edge contacts, rather than surface contacts, to avoid field interference caused by interlayers 940 and 942 that may have dielectric constants different from the dielectric constant of EO material layers 930, 932, and 934.

Figure 10:
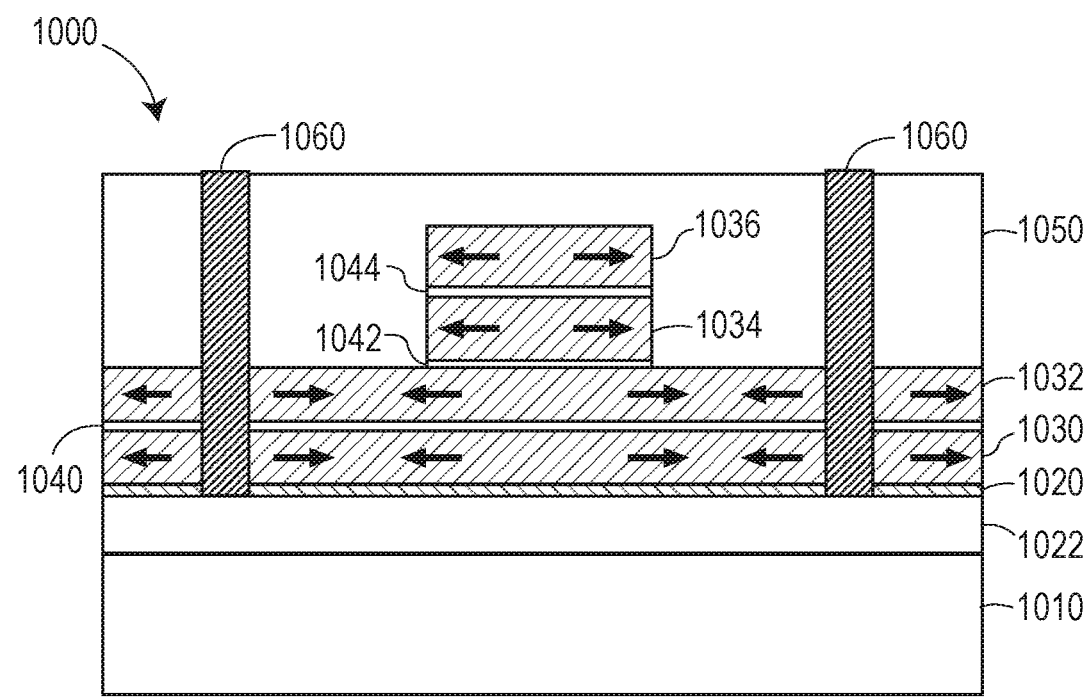
FIG. 10 is a simplified cross-sectional view of yet another example of a waveguide structure including an EO material layer that maintains a tetragonal phase at cryogenic temperatures, according to certain embodiments.

FIG. 10 is a simplified cross-sectional view of yet another example of a waveguide structure 1000 including EO material layers that can maintain a tetragonal phase at cryogenic temperatures according to certain embodiments. Waveguide structure 1000 may include a substrate 1010, which may be similar to substrate 152, 510, or 910 described above. Waveguide structure 1000 may also include a buffer layer 1022 and a seed layer 1020 on substrate 1010. Buffer layer 1022 may be similar to buffer layer 154, 540, 810, or 922 described above. One example of buffer layer 1022 is a $SiO_2$ layer. Seed layer 1020 may be similar to seed layer 156, 520, 820, or 920 described above. One example of seed layer 1020 is a STO layer. As described above, buffer layer 1022 may be formed by the high temperature oxidation annealing of seed layer 1020 deposited on substrate 1010 (e.g., silicon wafer), where substrate 1010 may be oxidized at the interface between seed layer 1020 and substrate 1010 to form buffer layer 1022 between seed layer 1020 and substrate 1010.

Waveguide structure 1000 may include multiple EO material layers 1030, 1032, 1034, 1036, and the like, and multiple interlayers 1040, 1042, 1044 and the like. As described above, EO material layers 1030, 1032, 1034, and 1036 may include ferroelectric crystals, such as BaTiO3 (BTO), (Ba, Sr)TiO3 (BST), (Pb(Zr,Ti)O3 (PZT), (Pb, La)(Zr,Ti)O3 (PLZT), and the like. Interlayers 1040, 1042, and 1044 may include, for example, MgO, BST, $BaHfO_3$, $BaZrO_3$, $SrHfO_3$, $SrNbO_3$, $SrTiO_3$, $SrZrO_3$, or other oxides. The EO material layers and the interlayers may be deposited alternately on top of seed layer 1020, such that the EO material layers and the interlayers may interleave and interlock with each other to form a stack of interleaved layers. The EO material layers and the interlayers may be thin layers, where the ratio between the thickness of each EO material layer and the thickness of each interlayers may be less than about 20:1, 10:1, 8:1, 5:1, or lower. In one example, the thickness of each EO material layer may be about 100 nm or thinner, and the thickness of each interlayer may be about 10 nm or thinner. The total thickness of the multiple EO material layers in the stack may be larger than a certain value, such as greater than about 300 nm.

Waveguide structure 1000 may further include a waveguide including a cladding layer 1050 and a waveguide core that includes some layers of the interleaved layers. In the example shown in FIG. 10, the waveguide core may include EO material layers 1034 and 1036 and interlayers 1042 and 1044, which may be patterned by, for example, photolithography. In some embodiments, interlayers 1044 and 1042 may be used as the etch stop layer for etching EO material layers 1034 and 1036. For example, interlayer 1044 may be used as the etch stop layer for etching EO material layer 1036 using a first recipe, interlayer 1044 may then be etched using a second recipe, and interlayer 1042 may be used as the etch stop layer for etching EO material layer 1034 using the first recipe. In this way, the waveguide core may be formed as a mesa structure that includes some EO material layers and interlayers.

Cladding layer 1050 may be formed on the waveguide core as described above with respect to, for example, block 450 of FIG. 4 and FIG. 5E. Cladding layer 1050 may include, for example, $Si_3N_4$, $SiO_2$, $Al_2O_3$, MgO, SiCN, SiON, SiCO, SiOCN, $HfO_2$, or the like. Trenches may be etched in cladding layer 1050 and some layers in the stack of interleaved layers from cladding layer 1050 down to the seed layer 1020 or buffer layer 1022, which may be used as the etch stop layer for etching the trenches. Conductive materials, such as metals (e.g., Cu, W, Co, etc.), may be deposited or otherwise fill the trenches and form electrodes 1060. As described above, electrodes 1060 may be used to apply voltage signals to EO material layers 1030 and 1032 through edge contacts, and/or to apply voltage signals to EO material layers 1034 and 1036.

Waveguide structures 800, 900, and 1000 described above may each include a stack of interleaved layers including alternating EO material layers and interlayers. The EO material layers and interlayers may be thin and may have similar lattice structure at room temperature, and thus may interlock after the manufacturing processes. The interlayers may include materials that may not undergo phase transitions when the operation temperature changes. Thus, the interlocking between the thin EO material layers and interlayers may prevent the EO material layers from phase transitions when the operation temperature changes, for example, to cryogenic temperatures. Thus, the EO material layers may substantially maintain its room-temperature lattice structure (e.g., tetragonal phase) and polarization (e.g., in-phase polarization) and thus the EO effect (e.g., Pockels coefficient) at cryogenic temperatures. Waveguide structures 800, 900, and 1000 may be used in optical switches, EO modulators, or other active photonic devices that operate at low temperatures using phase adjustment or refractive index modulation, such as Mach-Zehnder interferometer 120 or optical switch 100 described above.

In various embodiments of the waveguide structures and EO devices disclosed herein, single transverse mode waveguides (e.g., with the width of the waveguide core in the sub-micron to micron range) or multimode waveguides (with a wider waveguide core that supports two or more transverse modes) may be utilized. The various materials, layers, and structures may be formed using, for example, epitaxial growth, deposition, layer transfer, or the like, to fabricate the EO devices. Even though techniques for improving the Pockels effect at cryogenic temperatures are described in some embodiments, techniques disclosed herein can be used to improve other EO effects at different temperatures. One of ordinary skill in the art would recognize many variations, modifications, and alternatives.

Figure 11:
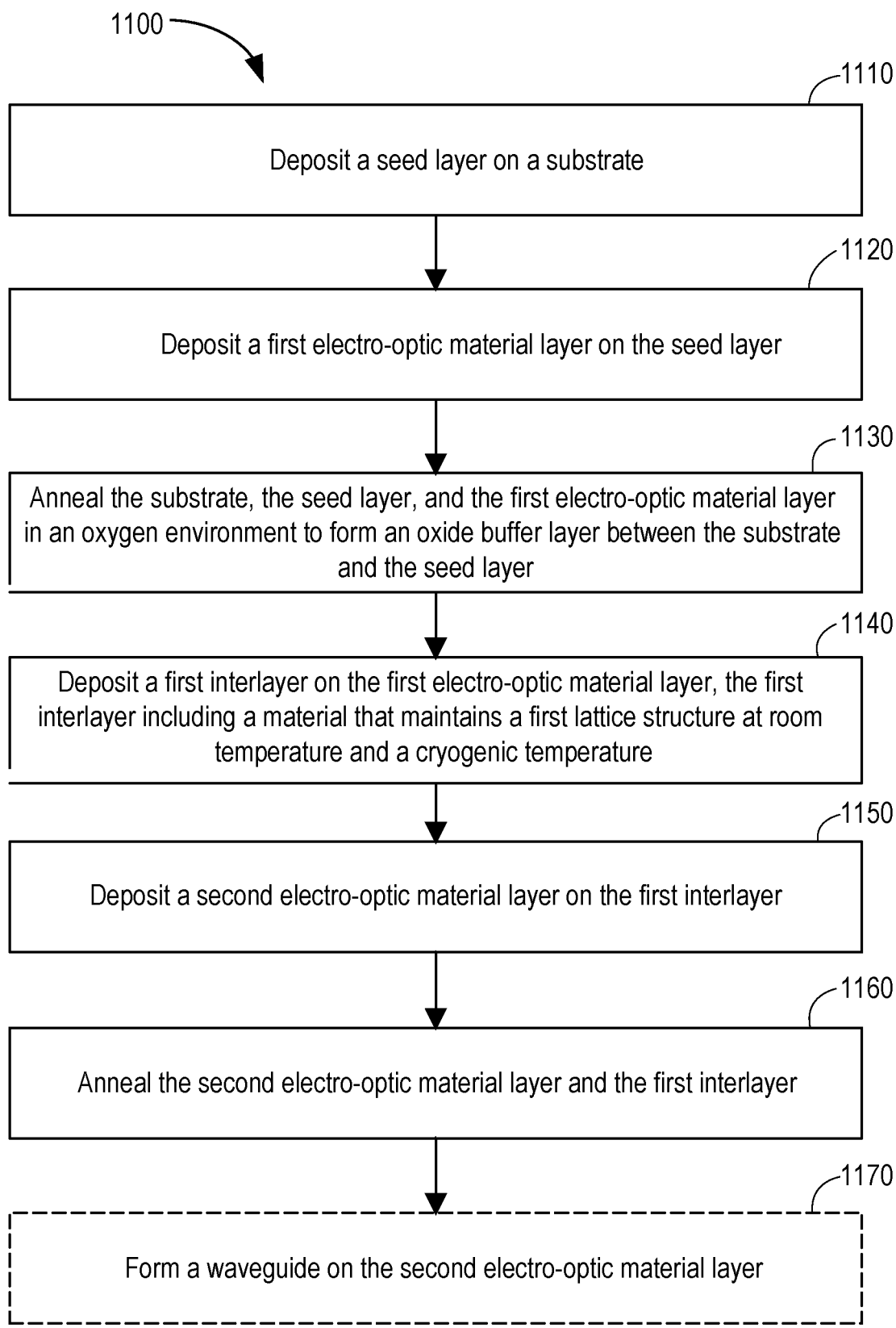
FIG. 11 is a simplified flow chart illustrating an example of a method for fabricating an engineered wafer and/or an EO device including an EO material layer characterized by a substantially constant EO coefficient from room temperature to cryogenic temperatures, according to certain embodiments.

FIG. 11 is a simplified flow chart 1100 illustrating an example of a method for fabricating an engineered wafer and/or an EO device including EO material layers characterized by a substantially constant EO coefficient from room temperature to cryogenic temperatures according to certain embodiments. Even though FIG. 11 describes the operations in a sequential flow, some of the operations may be performed in parallel or concurrently. Some operations may be performed in a different order. An operation may have additional steps not included in the figure. Some operations may be optional, and thus may be omitted in various embodiments. Some operations may be performed together with another operation.

At block 1110, the operations may include depositing a seed layer on a substrate. The substrate may include, for example, a semiconductor substrate (e.g., a silicon wafer), a glass substrate, a quartz substrate, a ceramic substrate, or the like, as described above. The seed layer may be epitaxially grown on the substrate using, for example, MBE techniques, and may include, for example, $SrTiO_3$ (STO), MgO, or $LaAlO_3$.

At block 1120, the operations may include epitaxially depositing a first electro-optic material layer on the seed layer using, for example, MBE techniques. The seed layer may have a lattice structure similar to the lattice structure of the first EO material layer and/or the lattice structure of the substrate, and may include, for example, ferroelectric or perovskite ferroelectric materials, such as BTO, BST, PZT, PLZT, or the like. The material in the first EO material layer may have a tetragonal lattice structure at room temperature, and, when used in bulk, may change its lattice structure and crystallographic phase at lower temperatures. The first EO material layer may have a thickness less than, for example, 100 nm.

At block 1130, the operations may include annealing the substrate, the seed layer, and the first electro-optic material layer in an oxygen environment to form an oxide buffer layer between the substrate and the seed layer. The annealing may be performed at, for example, a temperature above a softening temperature of the oxide buffer layer, such as above 600° C. (e.g., as 750° C. or higher). The high temperature annealing may help to form the oxide buffer layer (e.g., $SiO_2$) at the interface between the substrate (e.g., Si) and the seed layer (e.g., STO). When the annealing temperature is above the softening temperature of the oxide buffer layer, the oxide buffer layer may soften, and thus the seed layer and the first EO material layer may be decoupled from the substrate and may be allowed to release the stress in the seed layer and the first EO material layer.

At block 1140, the operations may include depositing a first interlayer on the first electro-optic material layer. The first interlayer may include a crystal structure similar to the crystal structure of the first EO material layer and may not undergo phase transitions at low temperatures. Thus, the first interlayer may include a material that can maintain a first lattice structure at room temperature and a cryogenic temperature (e.g., at about 4 K). The first interlayer may include, for example, at least one of MgO, $(Ba,Sr)TiO_3$, $BaHfO_3$, $BaZrO_3$, $SrHfO_3$, $SrNbO_3$, $SrTiO_3$, $SrZrO_3$, or the like.

At block 1150, the operations may include depositing a second electro-optic material layer on the first interlayer. The second electro-optic material layer may be similar to the first electro-optic material layer. At block 1160, the operations may include annealing the second electro-optic material layer and the first interlayer in high temperature annealing to relax the second EO material layer, improve the material quality, and ensure the in-plane polarization in the second EO material layer.

In some embodiments, additional interlayers and EO material layers may be alternately deposited until a total thickness of the EO material layers is greater than a desired value. In some embodiments, the additional layers including the interleaved interlayers and EO material layers may be annealed in high temperature annealing. The first, the second, and the additional interlayers may have a thickness less than, for example, about 10 nm, and may be used to separate EO material layers from each other and to impose tensile stress on the EO material layers to restrict phase transitions of the EO material layers. In some embodiments, the ratio between the thickness of each EO material layer and the thickness of each interlayer may be less than about 20:1, 10:1, 8:1, 5:1, or lower. Because the interlayers may not change the lattice structure and crystallographic phase at lower temperatures (e.g., cryogenic temperatures), the interlayers may restrict the EO material layers from changing its room temperature lattice structure and crystallographic phase at lower temperatures. Thus, the EO material layers may have high EO effects (e.g., Pockels effect) at lower temperatures. For example, the EO material layers may include BTO and may have a Pockels coefficient greater than 300 pm/V at cryogenic temperatures.

Optionally, at block 1170, a waveguide may be formed on the stack of interleaved interlayers and EO material layers. The waveguide may be a section of a Mach-Zehnder interferometer, a resonator, an optical switch, an electro-optic modulator, or the like. In some embodiments, the waveguide may include a waveguide core that includes a dielectric material or a semiconductor material, or one or more electro-optic material layers in the electro-optic material layers. In some embodiments, the waveguide may include a waveguide cladding layer that is in physical contact with an electro-optic material layer in the plurality of electro-optic material layers, and may be characterized by a thermal expansion coefficient different from a thermal expansion coefficient of the electro-optic material layer. The waveguide cladding layer may include, for example, at least one of $Si_3N_4$, $SiO_2$, $Al_2O_3$, MgO, SiCN, SiON, SiCO, SiOCN, or $HfO_2$.

In some embodiments, forming the waveguide may include patterning one or more electro-optic material layers to form a waveguide core, and depositing a dielectric cladding layer on the waveguide core. Patterning the one or more electro-optic material layers may include etching the one or more electro-optic material layers using an interlayer as an etch stop layer. In some embodiments, forming the waveguide may include depositing an layer of a high refractive index material on the stack of layers including the interlayers and the EO material layers, patterning the layer of the high refractive index material to form the waveguide core, and depositing a dielectric cladding layer on the waveguide core. In some embodiments, forming the waveguide may include bonding a wafer including the waveguide to the stack of layers including the interlayers and the EO material layers. In some embodiments, the method may also include etching trenches in the stack of layers including the interlayers and the EO material layers, and filling the trenches with a conductive material. In some embodiments, etching trenches in the stack of layers may include using the oxide buffer layer as an etch stop layer.

Figure 12:
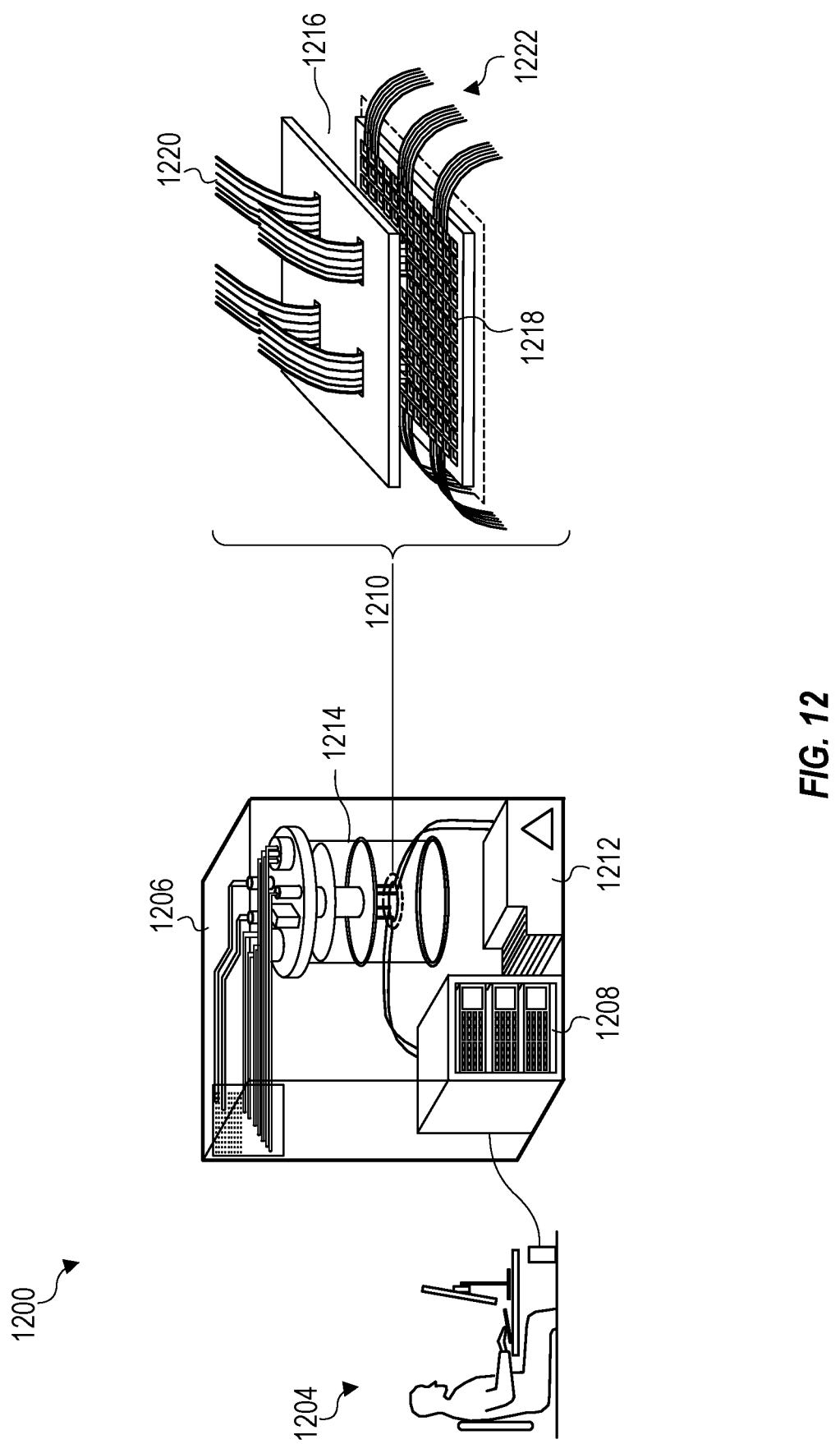
FIG. 12 is a simplified system block diagram of an example of a hybrid quantum computing system including electro-optic devices, according to certain embodiments.

FIG. 12 is a simplified system block diagram of an example of a hybrid quantum computing system 1200 including electro-optic devices (e.g., switches) according to certain embodiments. In order to operate at low temperatures, for example liquid helium temperatures, embodiments of the present invention integrate the electro-optic switches discussed herein into a system that includes cooling systems. Thus, embodiments of the present invention provide a hybrid computing system, for example, as illustrated in FIG. 12. The hybrid quantum computing (QC) system 1200 includes a user interface device 1204 that is communicatively coupled to a hybrid quantum computing subsystem 1206. The user interface device 1204 can be any type of user interface device, e.g., a terminal including a display, keyboard, mouse, touchscreen and the like. In addition, the user interface device can itself be a computer such as a personal computer (PC), laptop, tablet computer and the like.

In some embodiments, the user interface device 1204 provides an interface with which a user can interact with the hybrid QC subsystem 1206. For example, the user interface device 1204 may run software, such as a text editor, an interactive development environment (IDE), command prompt, graphical user interface, and the like so that the user can program, or otherwise interact with, the QC subsystem to run one or more quantum algorithms. In other embodiments, the hybrid QC subsystem 1206 may be pre-programmed and the user interface device 1204 may simply be an interface where a user can initiate a quantum computation, monitor the progress, and receive results from the hybrid QC subsystem 1206. Hybrid QC subsystem 1206 further includes a classical computing system 1208 coupled to one or more quantum computing chips 1210. In some examples, the classical computing system 1208 and the quantum computing chip 1210 can be coupled to other electronic components 1212, e.g., pulsed pump lasers, microwave oscillators, power supplies, networking hardware, etc.

In some embodiments that utilize cryogenic operation, the quantum computing system 1209 can be housed within a cryostat, e.g., cryostat 1214. In some embodiments, the quantum computing chip 1210 can include one or more constituent chips, e.g., hybrid electronic chip 1216 and integrated photonics chip 1218, which may include various waveguide structures and/or EO devices disclosed herein. Signals can be routed on- and off-chip any number of ways, e.g., via optical interconnects 1220 and via other electronic interconnects 1222. In addition, the hybrid quantum computing system 1200 may employ a quantum computing process, e.g., measurement-based quantum computing (MBQC) that employs one or more cluster states of qubits.

It will be apparent to those skilled in the art that substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A method comprising:
   depositing a seed layer on a substrate;
   epitaxially depositing a first electro-optic material layer on the seed layer;
   annealing the substrate, the seed layer, and the first electro-optic material layer in an oxygen environment, thereby forming an oxide buffer layer between the substrate and the seed layer;
   cooling the substrate after the annealing, thereby causing the first electro-optic material layer to be under tensile stress;
   depositing a first interlayer on the first electro-optic material layer, wherein the first interlayer includes a material that maintains a first lattice structure at room temperature and a cryogenic temperature;
   depositing a second electro-optic material layer on the first interlayer; and
   annealing the second electro-optic material layer and the first interlayer.

2. The method of claim 1, wherein the first electro-optic material layer and the second electro-optic material layer include an electro-optic material characterized by a second lattice structure at the cryogenic temperature different from a third lattice structure at the room temperature.

3. The method of claim 2, wherein the third lattice structure is a same crystal structure as the first lattice structure.

4. The method of claim 1, wherein annealing the substrate, the seed layer, and the first electro-optic material layer includes annealing at a temperature above a softening temperature of the oxide buffer layer.

5. The method of claim 1, further comprising:
   depositing a second interlayer on the second electro-optic material layer, wherein the second interlayer includes the material that maintains the first lattice structure at the room temperature and the cryogenic temperature;
   depositing a third electro-optic material layer on the second interlayer; and
   annealing the third electro-optic material layer and the second interlayer.

6. The method of claim 5, further comprising:
   patterning the third electro-optic material layer to form a waveguide core; and
   depositing a dielectric cladding layer on the waveguide core.

7. The method of claim 6, wherein patterning the third electro-optic material layer includes etching the third electro-optic material layer using the second interlayer as an etch stop layer.

8. The method of claim 5, further comprising forming a waveguide on the third electro-optic material layer.

9. The method of claim 8, wherein forming the waveguide on the third electro-optic material layer includes:
   forming a waveguide core on the third electro-optic material layer; and
   depositing a dielectric cladding layer on the waveguide core.

10. The method of claim 8, wherein forming the waveguide on the third electro-optic material layer includes bonding a wafer including the waveguide to the third electro-optic material layer.

11. The method of claim 8, further comprising:
    etching trenches in the first, second, and third electro-optic material layers and the first and second interlayers; and
    filling the trenches with a conductive material.

12. The method of claim 1, wherein a ratio between a thickness of the first electro-optic material layer and a thickness of the first interlayer is equal to or less than 20:1.

13. A method comprising:
    providing a substrate;
    forming a first electro-optic material layer on the substrate;
    forming a buffer layer between the substrate and the first electro-optic material layer;
    cooling the substrate after the forming the buffer layer;
    forming a first interlayer on the first electro-optic material layer, wherein the first interlayer includes a material that maintains a first lattice structure at room temperature and a cryogenic temperature;
    forming a second electro-optic material layer on the first interlayer; and
    annealing the second electro-optic material layer and the first interlayer,
    wherein the cooling the substrate after the annealing causes the first electro-optic material layer to be under tensile stress.

14. The method of claim 13 wherein the substrate includes a seed layer and wherein the first electro-optic material layer is deposited on the seed layer.

15. The method of claim 14 wherein the first electro-optic material layer is epitaxially deposited on the seed layer.

16. The method of claim 14 wherein the buffer layer is formed by annealing the substrate, the seed layer and the first electro-optic material layer in an oxygen environment.

17. The method of claim 16 wherein the buffer layer comprises an oxide buffer layer that is formed between the substrate and the seed layer.

18. The method of claim 13 wherein the first electro-optic material layer, the first interlayer, and the second electro-optic material layer are formed using a deposition process.

19. The method of claim 13 wherein the buffer layer relieves stress between the first electro-optic material layer and the substrate.

* * * * *